US010191246B2

(12) United States Patent
Saito

(10) Patent No.: US 10,191,246 B2
(45) Date of Patent: Jan. 29, 2019

(54) ZOOM LENS AND IMAGING APPARATUS

(71) Applicant: FUJIFILM Corporation, Tokyo (JP)

(72) Inventor: Hiroki Saito, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/630,678

(22) Filed: Jun. 22, 2017

(65) Prior Publication Data
US 2017/0371132 A1    Dec. 28, 2017

(30) Foreign Application Priority Data

Jun. 28, 2016  (JP) ................................. 2016-127178

(51) Int. Cl.
| | | |
|---|---|---|
| *G02B 9/60* | (2006.01) | |
| *G02B 13/04* | (2006.01) | |
| *G02B 13/00* | (2006.01) | |
| *G02B 13/18* | (2006.01) | |
| *G02B 15/20* | (2006.01) | |
| G02B 15/173 | (2006.01) | |

(52) U.S. Cl.
CPC ........... *G02B 9/60* (2013.01); *G02B 13/0045* (2013.01); *G02B 13/04* (2013.01); *G02B 13/18* (2013.01); *G02B 15/20* (2013.01); *G02B 13/009* (2013.01); *G02B 15/173* (2013.01)

(58) Field of Classification Search
CPC .................................. G02B 9/60; G02B 13/04
USPC ......................... 359/682, 746, 753, 763–770
See application file for complete search history.

(56) References Cited

U.S. PATENT DOCUMENTS

| | | | | |
|---|---|---|---|---|
| 5,325,233 A * | 6/1994 | Nakatsuji | ............. | G02B 15/177 359/683 |
| 7,450,314 B2 * | 11/2008 | Satori | .................. | G02B 15/173 359/676 |
| 7,920,332 B2 * | 4/2011 | Ohtake | ................ | G02B 15/173 359/676 |
| 8,339,714 B2 * | 12/2012 | Tochigi | ................ | G02B 15/173 359/683 |
| 8,873,169 B2 * | 10/2014 | Nanba | .................. | G02B 15/173 359/766 |
| 8,976,459 B2 * | 3/2015 | Yanai | ..................... | G02B 15/14 348/340 |
| 2011/0273780 A1 | 11/2011 | Hosoi et al. | | |

(Continued)

FOREIGN PATENT DOCUMENTS

| | | |
|---|---|---|
| JP | 2007-219315 A | 8/2007 |
| JP | 2011-237588 A | 11/2011 |

Primary Examiner — Nicholas R. Pasko
(74) Attorney, Agent, or Firm — Studebaker & Brackett PC

(57) ABSTRACT

The zoom lens consists of, in order from an object side, a first lens group having a positive power, a second lens group having a negative power, a third lens group having a positive power, a fourth lens group having a negative power, and a fifth lens group having a positive power. An aperture diaphragm is disposed between a surface of the second lens group closest to an image side and a surface of the fourth lens group closest to the object side. The first lens group and the fifth lens group each consist of two or less lenses. A negative meniscus lens, which is convex toward the object side, is disposed to be closest to the object side of the second lens group. A negative meniscus lens, which is convex toward the image side, is disposed to be closest to the image side of the fourth lens group.

9 Claims, 26 Drawing Sheets

(56) References Cited

U.S. PATENT DOCUMENTS

2014/0375844 A1* 12/2014 Matsumura .......... G02B 15/173
348/240.3

* cited by examiner

FIG. 1
EXAMPLE 1
WIDE
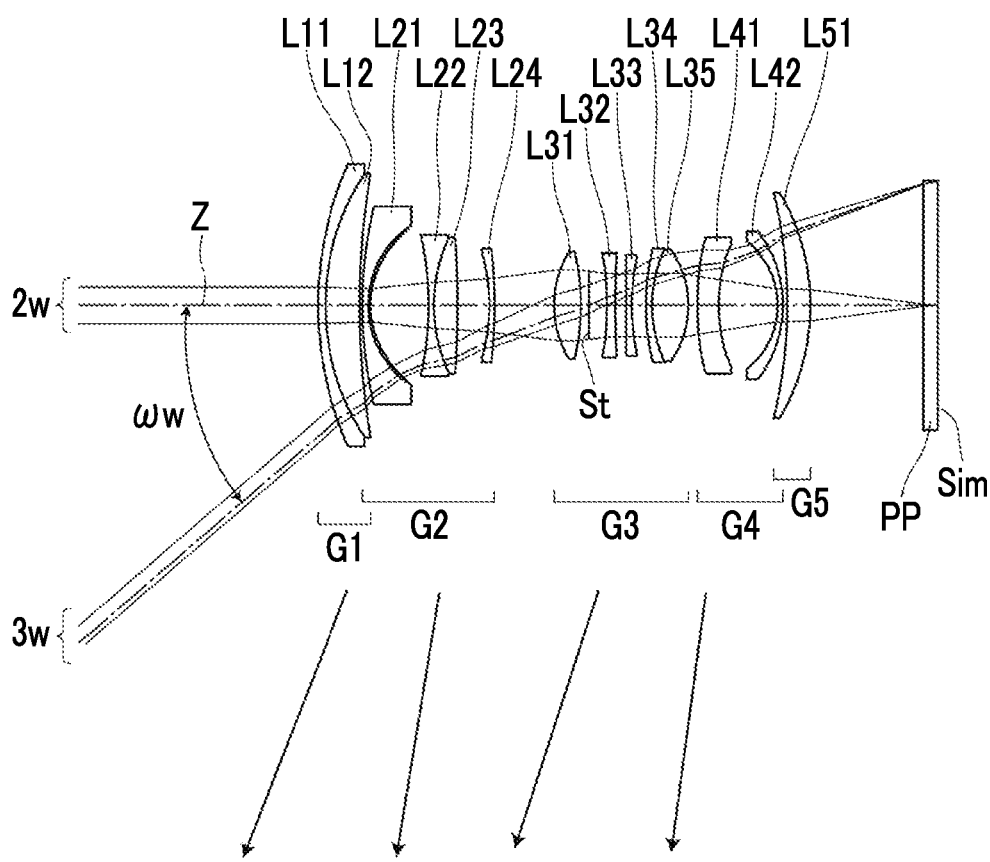
TELE
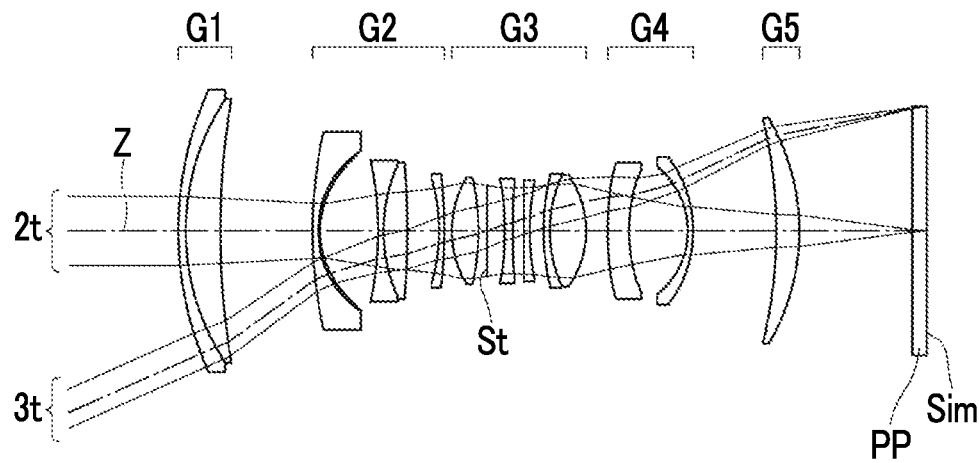

FIG. 2
EXAMPLE 2
WIDE
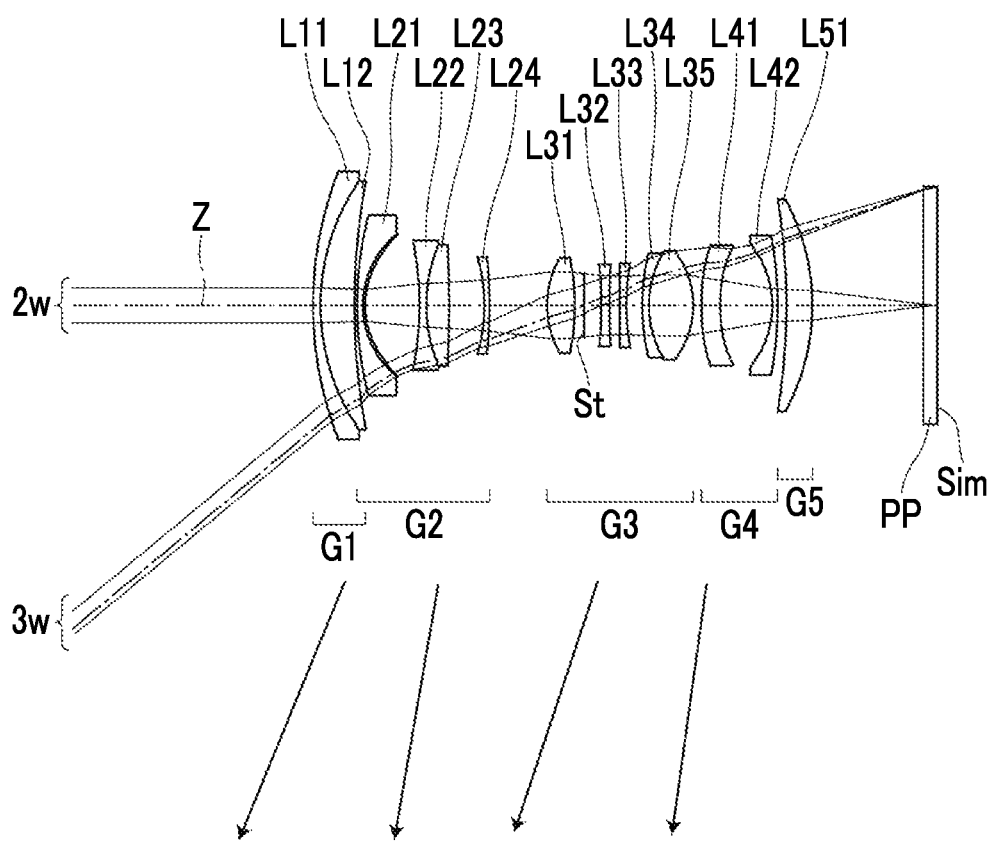
TELE
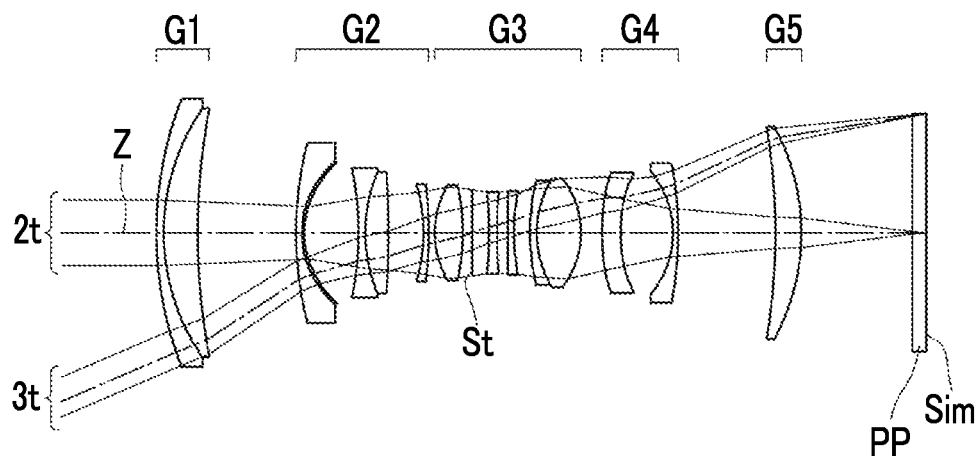

FIG. 3
EXAMPLE 3
WIDE
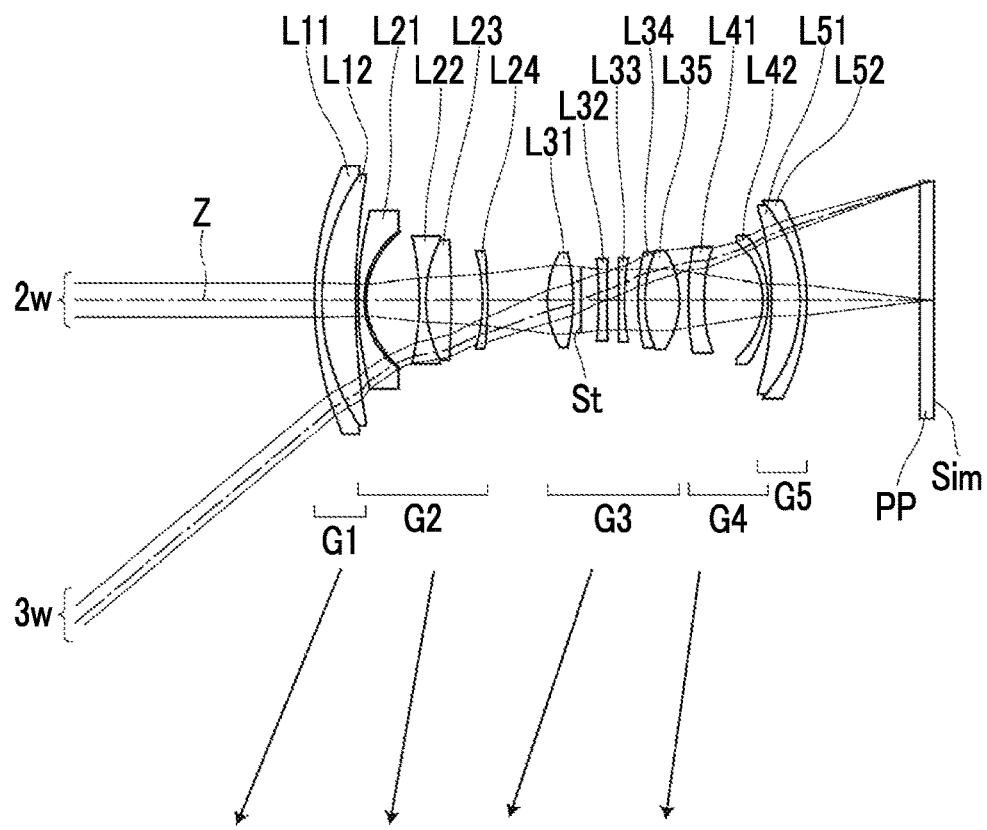
TELE
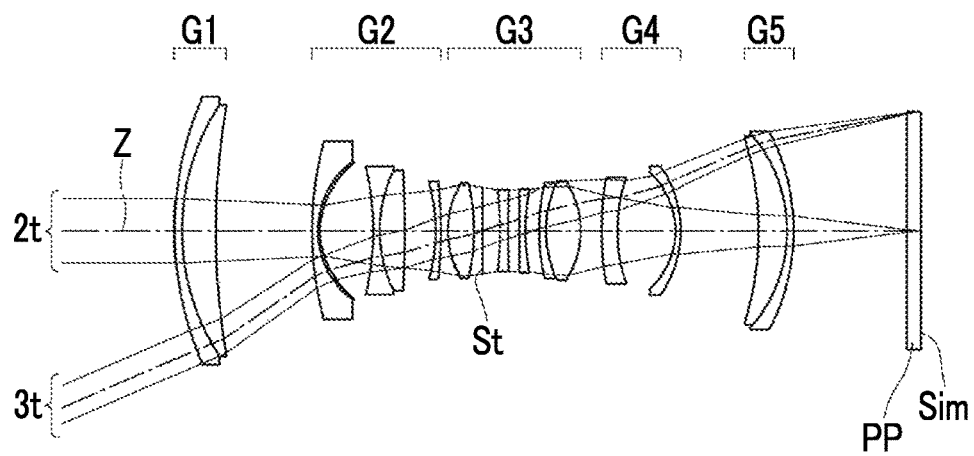

FIG. 4
EXAMPLE 4
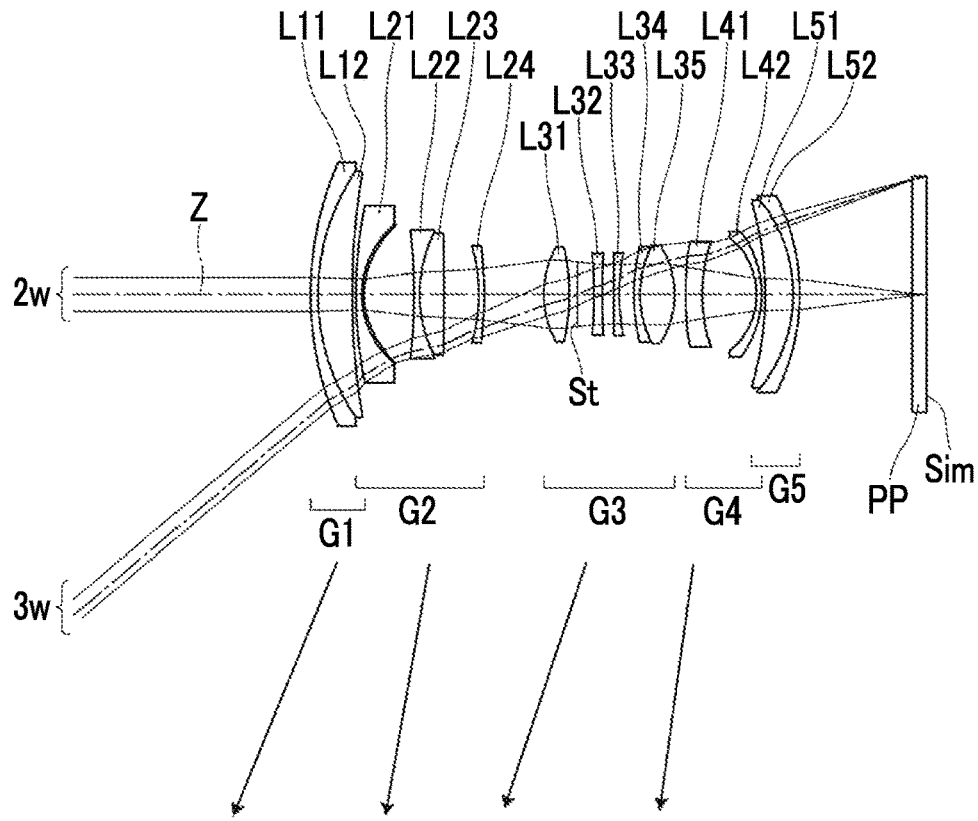
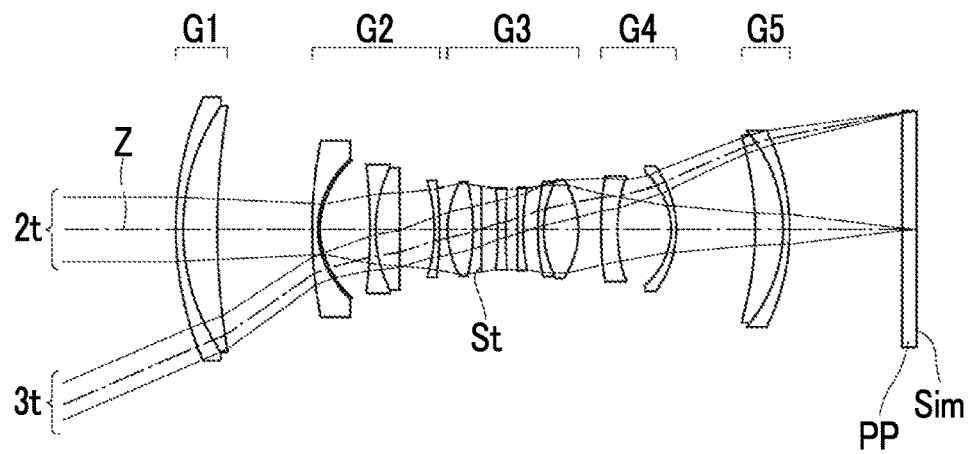

FIG. 5
EXAMPLE 5
WIDE
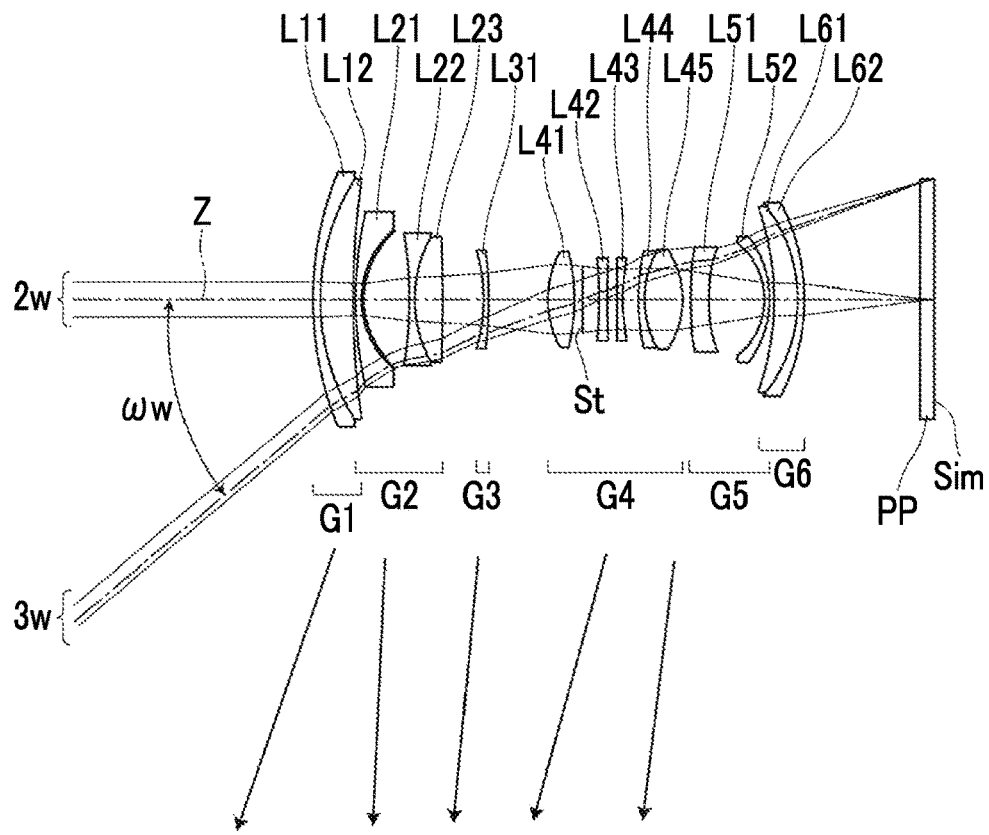
TELE
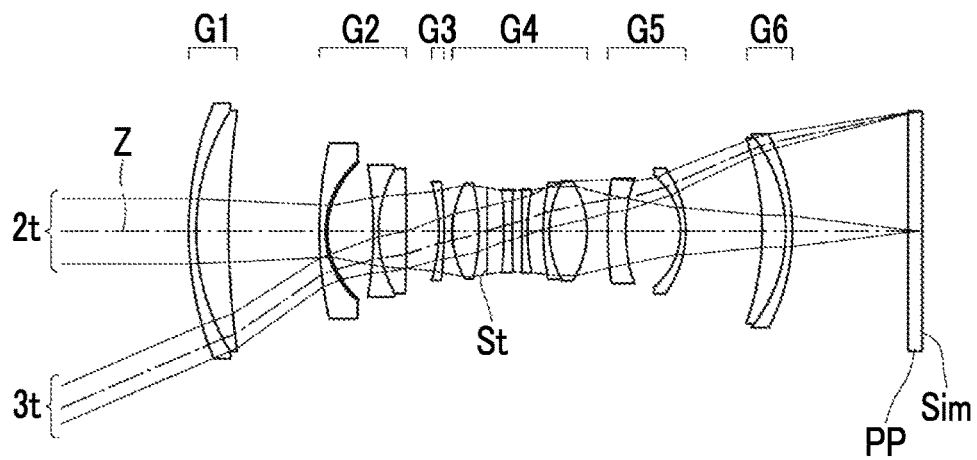

EXAMPLE 1

EXAMPLE 1

EXAMPLE 2

EXAMPLE 3

EXAMPLE 4

EXAMPLE 5

ZOOM LENS AND IMAGING APPARATUS

CROSS-REFERENCE TO RELATED APPLICATIONS

The present application claims priority under 35 U.S.C. § 119 to Japanese Patent Application No. 2016-127178, filed on Jun. 28, 2016. The above application is hereby expressly incorporated by reference, in its entirety, into the present application.

BACKGROUND OF THE INVENTION

1. Field of the Invention

The present invention relates to a zoom lens, which is appropriate for a digital camera, a video camera, and/or the like, and an imaging apparatus which comprises the zoom lens.

2. Description of the Related Art

In the past, in zoom lenses used in digital cameras, a lens system of the 5-group or 6-group configuration has been proposed. For example, the following JP2007-219315A and JP2011-237588A describe a lens system including, in order from an object side: a first lens group that has a positive refractive power; a second lens group that has a negative refractive power; a third lens group that has a positive refractive power; a fourth lens group that has a negative refractive power; and a fifth lens group that has a positive refractive power, where an interval of each lens group varies during zooming.

SUMMARY OF THE INVENTION

In zoom lenses used in digital cameras and the like, it is necessary for the lens system to have small fluctuation in F number during zooming with a wide angle while having a small size and having high performance. However, the zoom lens described in JP2007-219315A has a large number of lenses. Thus, there are problems of an increase in size of the lens and an increase in weight thereof. Further, the zoom lens of the 5-group configuration described in JP2011-237588A has room for improvement in correction of coma aberration in the peripheral portion of the imaging area.

The present invention has been made in consideration of the above-mentioned situation, and its object is to provide a zoom lens, which has high optical performance by satisfactorily correcting coma aberration while keeping a size thereof small and keeping fluctuation in F number small during zooming with a wide angle, and an imaging apparatus comprising the zoom lens.

A first zoom lens of the present invention consisting of, in order from an object side: a first lens group that has a positive refractive power; a second lens group that has a negative refractive power; a third lens group that has a positive refractive power; a fourth lens group that has a negative refractive power; and a fifth lens group that has a positive refractive power. All intervals between the lens groups adjacent to each other change during zooming. An aperture diaphragm is disposed between a surface of the second lens group closest to an image side and a surface of the fourth lens group closest to the object side. The first lens group and the fifth lens group each consist of two or less lenses. A lens of the second lens group closest to the object side is a meniscus lens which has a negative refractive power and of which an object side surface has a convex shape. A lens of the fourth lens group closest to the image side is a meniscus lens which has a negative refractive power and of which an image side surface has a convex shape.

It is preferable that the first zoom lens of the present invention satisfies the following conditional expression (1).

$$-2.5 < f_w \times \tan(\omega w)/R4r < -0.1 \quad (1)$$

Here, fw is a focal length of the zoom lens at a wide-angle end,

ωw is a maximum half angle of view of the zoom lens at the wide-angle end, and

R4r is a radius of curvature of an image side surface of the lens closest to the image side in the fourth lens group.

It is preferable that the first zoom lens of the present invention satisfies the following conditional expression (2).

$$0.1 < (R4r - R4f)/(R4r + R4f) < 0.9 \quad (2)$$

Here, R4r is a radius of curvature of an image side surface of the lens closest to the image side in the fourth lens group, and R4f is a radius of curvature of an object side surface of the lens closest to the image side in the fourth lens group.

It is preferable that the first zoom lens of the present invention satisfies the following conditional expression (3).

$$-0.35 < f4/f1 < -0.10 \quad (3)$$

Here, f4 is a focal length of the fourth lens group, and f1 is a focal length of the first lens group.

In the first zoom lens of the present invention, it is preferable that both a lens of the third lens group closest to the object side and a lens of the third lens group closest to the image side are positive lenses.

In the first zoom lens of the present invention, it is preferable that an aspheric resin is attached to at least one of an object side surface and an image side surface of the lens of the second lens group closest to the object side.

In the first zoom lens of the present invention, focusing may be performed by moving only a lens of the second lens group closest to the image side.

In the first zoom lens of the present invention, it is preferable that in the second lens group, at least one group of cemented lenses, each of which is formed by cementing a negative lens and a positive lens, is provided.

In the first zoom lens of the present invention, during zooming, the fifth lens group may remain stationary with respect to an image plane.

A second zoom lens of the present invention consisting of, in order from an object side: a first lens group that has a positive refractive power; a second lens group that has a negative refractive power; a third lens group that has a negative refractive power; a fourth lens group that has a positive refractive power; a fifth lens group that has a negative refractive power; and a sixth lens group that has a positive refractive power. All intervals between the lens groups adjacent to each other change during zooming. An aperture diaphragm is disposed between a surface of the third lens group closest to an image side and a surface of the fifth lens group closest to the object side. The first lens group and the sixth lens group each consist of two or less lenses. A lens of the second lens group closest to the object side is a meniscus lens which has a negative refractive power and of which an object side surface has a convex shape. In addition, a lens of the fifth lens group closest to the image side is a meniscus lens which has a negative refractive power and of which an image side surface has a convex shape.

It is preferable that the second zoom lens of the present invention satisfies the following conditional expression (4).

$$-2.5<fw\times\tan(\omega w)/R5r<-0.1 \quad (4)$$

Here, fw is a focal length of the zoom lens at a wide-angle end,

ωw is a maximum half angle of view of the zoom lens at the wide-angle end, and

R5r is a radius of curvature of an image side surface of the lens closest to the image side in the fifth lens group.

It is preferable that the second zoom lens of the present invention satisfies the following conditional expression (5).

$$0.1<(R5r-R5f)/(R5r+R5f)<0.9 \quad (5)$$

Here, R5r is a radius of curvature of an image side surface of the lens closest to the image side in the fifth lens group, and R5f is a radius of curvature of an object side surface of the lens closest to the image side in the fifth lens group.

It is preferable that the second zoom lens of the present invention satisfies the following conditional expression (6).

$$-0.35<f5/f1<-0.10 \quad (6)$$

Here, f5 is a focal length of the fifth lens group, and f1 is a focal length of the first lens group.

In the second zoom lens of the present invention, it is preferable that both a lens of the fourth lens group closest to the object side and a lens of the fourth lens group closest to the image side are positive lenses.

In the second zoom lens of the present invention, it is preferable that an aspheric resin is attached to at least one of an object side surface and an image side surface of the lens of the second lens group closest to the object side.

In the second zoom lens of the present invention, focusing may be performed by moving only the third lens group.

In the second zoom lens of the present invention, it is preferable that in the second lens group, at least one group of cemented lenses, each of which is formed by cementing a negative lens and a positive lens, is provided.

In the second zoom lens of the present invention, during zooming, the sixth lens group may remain stationary with respect to an image plane.

An imaging apparatus of the present invention comprises a first and/or second zoom lens of the present invention.

It should be noted that the term "consist(ing) of ~" means that the lens may include not only the above-mentioned elements but also lenses substantially having no powers, optical elements, which are not lenses, such as a diaphragm and a cover glass, and mechanism parts such as a lens flange, a lens barrel, an imaging element, and a hand shaking correction mechanism.

In addition, the term "~ lens group that has a positive refractive power" means that the lens group has a positive refractive power as a whole. It is the same for the term "~ lens group that has a negative refractive power". Signs of refractive powers of the lens groups, signs of refractive powers of the lenses, and radii of curvature of surfaces are assumed as those in paraxial regions in a case where some lenses have aspheric surfaces. The "lens group" is not necessarily formed of a plurality of lenses, but may be formed as only one lens.

In addition, the number of lenses mentioned above is the number of lenses formed as the elements. For example, the number of lenses of the cemented lens, in which a plurality of single lenses having different materials is cemented, indicates the number of single lenses constituting the cemented lens. However, a compound aspheric lens (a lens which is integrally formed of a spherical lens and a film having an aspheric shape formed on the spherical lens, and functions as one aspheric lens as a whole) is not considered as a cemented lens, and is treated as a single lens. Further, all the conditional expressions are based on the d line (a wavelength of 587.6 nm) in a state where an object at infinity is in focus.

According to the present invention, there is provided a lens system having a 5-group configuration of arrangement of positive, negative, positive, negative, and positive powers, in order from the object side, and a 6-group configuration of positive, negative, negative, positive, negative, and positive powers, in order from the object side. In the lens system, a position of the aperture diaphragm is appropriately set, the number of lenses of the lens group of the object side closest to the object side and of the lens group closet to image side is defined, and a configuration of a lens closest to the object side in the second lens group from the object side and a lens closest to the image side in the second lens group from the image side is appropriately set. Thereby, it is possible to provide a zoom lens which has small fluctuation in F number during zooming with a wide angle and that has a high optical performance and for which coma aberration is satisfactorily corrected with a size kept small, and an imaging apparatus comprising the zoom lens.

BRIEF DESCRIPTION OF THE DRAWINGS

FIG. 1 is a cross-sectional view illustrating a configuration of a zoom lens of Example 1 of the present invention.

FIG. 2 is a cross-sectional view illustrating a configuration of a zoom lens of Example 2 of the present invention.

FIG. 3 is a cross-sectional view illustrating a configuration of a zoom lens of Example 3 of the present invention.

FIG. 4 is a cross-sectional view illustrating a configuration of a zoom lens of Example 4 of the present invention.

FIG. 5 is a cross-sectional view illustrating a configuration of a zoom lens of Example 5 of the present invention.

DESCRIPTION OF THE PREFERRED EMBODIMENTS

Figure 6:
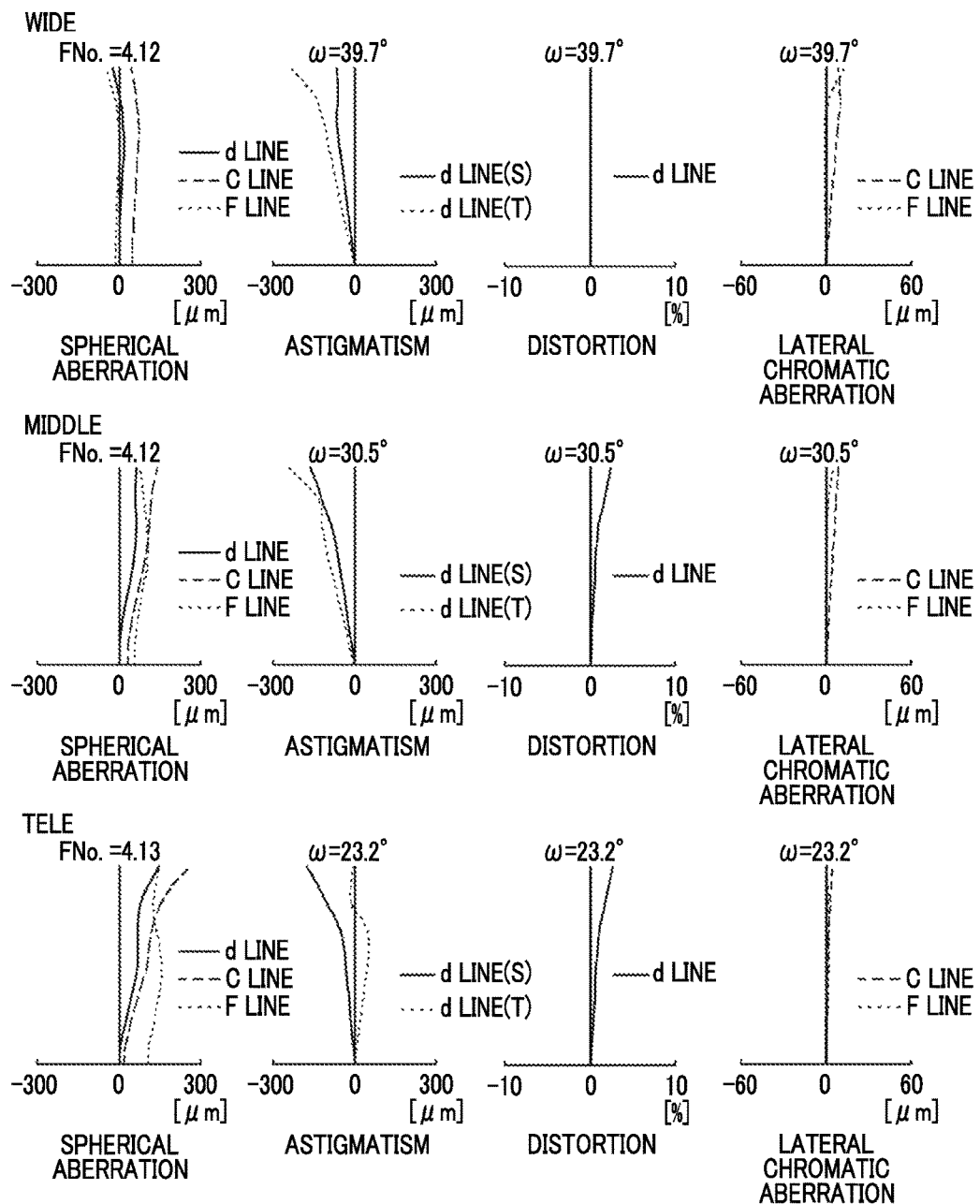
FIG. 6 shows spherical aberration diagrams, astigmatism diagrams, distortion diagrams, lateral chromatic aberration diagrams of the zoom lens of Example 1 of the present invention.

Hereinafter, embodiments of the present invention will be described with reference to drawings.

First, a zoom lens according to a first embodiment of the present invention will be described with reference to FIG. 1. FIG. 1 is a cross-sectional view illustrating a configuration and an optical path of the zoom lens according to the first embodiment of the present invention, and corresponds to Example 1 to be described later. FIG. 1 shows a situation where the object at infinity is in focus, the left side thereof is an object side, and the right side thereof is an image side. In FIG. 1, a wide-angle end state is shown in the upper part thereof indicated by "WIDE" and a telephoto end state is shown in the lower part thereof indicated by "TELE". As for rays, on-axis rays 2w at the wide-angle end, off-axis rays 3w with the maximum half angle of view, on-axis rays 2t at the telephoto end, and off-axis rays 3t with the maximum half angle of view are shown in the drawing. In addition, as for an angle formed between principal rays of the off-axis rays 3w and an optical axis Z, a maximum half angle of view ωw at the wide-angle end is also shown in the drawing.

Lens groups constituting the zoom lens according to the first embodiment include, in order from the object side to the image side along the optical axis Z: a first lens group G1 that has a positive refractive power; a second lens group G2 that has a negative refractive power; and a third lens group G3 that has a positive refractive power; a fourth lens group G4 that has a negative refractive power; and a fifth lens group G5 that has a positive refractive power.

In the example shown in FIG. 1, the first lens group G1 includes two lenses as lenses L11 and L12 in order from the object side, the second lens group G2 includes four lenses as lenses L21 to L24 in order from the object side, the third lens group G3 includes five lenses as lenses L31 to L35 in order from the object side, the fourth lens group G4 includes two lenses as lenses L41 and L42 in order from the object side, and the fifth lens group G5 includes only a lens L51. However, the number of lenses constituting each lens group can be set to be different from that in the example shown in FIG. 1 as long as the number is within a range of the present invention.

FIG. 1 shows an example in which an optical member PP having a plane parallel plate shape is disposed on the image side of the lens system. The optical member PP is assumed to be an infrared cut filter, a low pass filter, various other filters, a cover glass, and/or the like. In the present invention, the optical member PP may be disposed at a position different from that in the example of FIG. 1, or the optical member PP may be omitted. Further, FIG. 1 shows an example in which a position of the image side surface of the optical member PP coincides with a position of the image plane Sim, but the position of the image plane Sim is not necessarily limited to this configuration.

The zoom lens is configured such that all intervals between the lens groups adjacent to each other change during zooming. In the example of FIG. 1, the first to fourth lens groups G1 to G4 move during zooming, and the fifth lens group G5 remains stationary with respect to the image plane Sim. In FIG. 1, schematic movement loci of the lens groups moving during zooming from the wide-angle end to the telephoto end are indicated by arrows between the upper part and the lower part.

In the zoom lens, an aperture diaphragm St is disposed between a surface of the second lens group G2 closest to the image side and a surface of the fourth lens group G4 closest to the object side. In the example of FIG. 1, the aperture diaphragm St is disposed inside the third lens group G3, and the aperture diaphragm St moves integrally with the third lens group G3 during zooming. It should be noted that the aperture diaphragm St shown in FIG. 1 does not necessarily indicate its size and shape, and indicates a position of the diaphragm on the optical axis Z.

The zoom lens has arrangement of positive, negative, positive, negative, and positive powers in order from the object side, the position of the aperture diaphragm St is set in the range, and all the intervals between the lens groups adjacent to each other is changed during zooming. Thereby, aberrations are satisfactorily corrected, and thus it is possible to realize a zoom lens having small fluctuation in F number during zooming. In particular, by adopting the power arrangement and setting the position of the aperture diaphragm St in the range, it becomes easy to minimize an amount of movement of the aperture diaphragm St during zooming. As a result, it becomes easy to reduce fluctuation in F number during zooming.

The first lens group G1 is formed to include two or less lenses, and the fifth lens group G5 is formed to include two or less lenses. With such a configuration, it is possible to avoid an increase in size of the lens system and an increase in weight thereof. In particular, by minimizing the number of lenses of the first lens group G1 in which lens diameters tend to increase, it becomes easy to achieve a small-size and lightweight configuration.

Further, a lens of the second lens group G2 closest to the object side is a meniscus lens which has a negative refractive power and of which an object side surface has a convex shape. A lens of the fourth lens group G4 closest to the image side is a meniscus lens which has a negative refractive power and of which an image side surface has a convex shape. With such a configuration, the aperture diaphragm St is disposed therebetween, whereby it is possible to enhance symmetry of the object-side and image-side lens configurations. Therefore, it is possible to suppress occurrence of coma aberration. As a result, there is an advantage in achieving the wide angle.

Hereinafter, preferred and available configurations of the zoom lens will be described. It is preferable that the zoom lens satisfies the following conditional expression (1).

$$-2.5 < fw \times \tan(\omega w)/R4r < -0.1 \quad (1)$$

Here, fw is a focal length of the zoom lens at the wide-angle end,

ωw is a maximum half angle of view of the zoom lens at the wide-angle end, and

R4r is a radius of curvature of the image side surface of the lens closest to the image side in the fourth lens group.

The conditional expression (1) defines a ratio of a paraxial image height of the zoom lens at the wide-angle end to a radius of curvature of the image side surface of the negative meniscus lens of the fourth lens group G4 closest to the image side, and indicates a condition relating to suppression in occurrence of coma aberration at the wide-angle end. By not allowing the result of the conditional expression (1) to be equal to or less than the lower limit, it becomes easy to prevent coma aberration at the wide-angle end from being excessively corrected. By not allowing the result of the conditional expression (1) to be equal to or greater than the upper limit, it becomes easy to prevent coma aberration at the wide-angle end from being insufficiently corrected. By making the zoom lens satisfy the conditional expression (1), it becomes easy to satisfactorily suppress occurrence of coma aberration at the wide-angle end.

In order to enhance the effect of the conditional expression (1), it is more preferable that the following conditional expression (1-1) is satisfied, and it is yet more preferable that the following conditional expression (1-2) is satisfied.

$$-1.5 < fw \times \tan(\omega w)/R4r < -0.3 \quad (1-1)$$

$$-1.3 < fw \times \tan(\omega w)/R4r < -0.7 \quad (1-2)$$

It is preferable that the zoom lens satisfies the following conditional expression (2).

$$0.1 < (R4r-R4f)/(R4r+R4f) < 0.9 \quad (2)$$

Here, R4r is a radius of curvature of an image side surface of the lens closest to the image side in the fourth lens group, and R4f is a radius of curvature of an object side surface of the lens closest to the image side in the fourth lens group.

The conditional expression (2) defines a shape factor of the negative meniscus lens of the fourth lens group G4 closest to the image side in the zoom lens, and indicates a condition relating to correction for fluctuation in coma aberration caused by zooming. By not allowing the result of the conditional expression (2) to be equal to or less than the lower limit, it becomes easy to prevent coma aberration from being insufficiently corrected. By not allowing the result of the conditional expression (2) to be equal to or greater than the upper limit, it becomes easy to prevent coma aberration from being excessively corrected.

In order to enhance the effect of the conditional expression (2), it is more preferable that the following conditional expression (2-1) is satisfied, and it is yet more preferable that the following conditional expression (2-2) is satisfied.

$$0.13 < (R4r-R4f)/(R4r+R4f) < 0.8 \quad (2-1)$$

$$0.15 < (R4r-R4f)/(R4r+R4f) < 0.6 \quad (2-2)$$

It is preferable that the zoom lens satisfies the following conditional expression (3).

$$-0.35 < f4/f1 < -0.10 \quad (3)$$

Here, f4 is a focal length of the fourth lens group, and f1 is a focal length of the first lens group.

The conditional expression (3) defines a ratio of the focal length of the fourth lens group G4 to the focal length of the first lens group G1. By not allowing the result of the conditional expression (3) to be equal to or less than the lower limit, it is possible to prevent the refractive power of the first lens group G1 from being excessive with respect to the refractive power of the fourth lens group G4. As a result, it becomes easy to suppress occurrence of curvature of field. By not allowing the result of the conditional expression (3) to be equal to or greater than the upper limit, it is possible to prevent the refractive power of the first lens group G1 from being insufficient with respect to the refractive power of the fourth lens group G4. As a result, it is possible to prevent the size of the first lens group G1 from increasing.

In order to enhance the effect relating to the conditional expression (3), it is more preferable that the following conditional expression (3-1) is satisfied.

$$-0.3 < f4/f1 < -0.2 \quad (3-1)$$

In the zoom lens, it is preferable that an aspheric resin is attached to at least one of the object side surface and the image side surface of the lens of the second lens group G2 closest to the object side. Thereby, the lens of the second lens group G2 closest to the object side can be formed as a compound aspheric lens. In a case where the aspheric lens is formed to have the aspheric resin attached thereto, as compared with a glass aspheric lens entirely formed of glass, it is possible to satisfactorily correct distortion while suppressing cost of manufacturing. Further, at the lens of the second lens group G2 closest to the object side among the lenses included in the second lens group G2, a degree of separation of rays for each image height becomes highest. Therefore, by forming the lens as an aspheric lens, it is possible to effectively perform aberration correction.

Further, it is preferable that in the second lens group G2, at least one group of cemented lenses, each of which is formed by cementing a negative lens and a positive lens, is provided. In such a case, it is possible to suppress occurrence of ghost caused by reflection between lens surfaces of the negative lens and the positive lens while suppressing occurrence of aberrations caused by relative positional deviation between the lenses.

Regarding focusing, by moving only the lens of the second lens group G2 closest to the image side, focusing may be performed. In such a case, it is possible to realize a focusing system capable of minimizing the weights of the lenses moving during focusing while suppressing fluctuation in aberrations caused by the imaging distance.

It is preferable that a lens of the third lens group G3 closest to the object side is a positive lens, and a lens of the third lens group G3 closest to the image side is a positive lens. In such a case, it is possible to satisfactorily correct spherical aberration while suppressing occurrence of aberrations in the peripheral portion of the imaging area.

The fifth lens group G5 may be formed to move during zooming, and may be formed to remain stationary with respect to the image plane Sim during zooming. In a case where the fifth lens group G5 moves during zooming, it becomes easy to reduce fluctuation in aberrations during zooming. In a case where the fifth lens group G5 remains stationary during zooming, it is possible to further simplify a mechanical configuration of the apparatus. As a result, there is an advantage in reducing the size of the apparatus.

The respective lens groups may have the following configurations, for example. The first lens group G1 may include, in order from the object side, a cemented lens in which a negative meniscus lens convex toward the object side and a positive meniscus lens convex toward the object side are cemented. The second lens group G2 may include, in order from the object side: a negative meniscus lens of which an image side surface has an aspheric resin attached thereto and which is convex toward the object side; a cemented lens in which a biconcave lens and a biconvex lens are cemented in order from the object side; and a negative meniscus lens which is convex toward the image side. Lenses constituting the third lens group G3 may include, in order from the object side: a biconvex lens; a biconcave lens; a negative lens which is concave toward the image side; and a cemented lens in which a negative meniscus lens convex toward the object side and a biconvex lens are cemented in order from the object side. Each of the first to third lenses of the third lens group G3 from the object side may be formed as a single no-cemented lens. The fourth lens group G4 may include, in order from the object side: a negative meniscus lens which is convex toward the object side; and a negative meniscus lens which is convex toward the image side. The fifth lens group G5 may include only a positive meniscus lens which is convex toward the image side. Alternatively, the fifth lens group G5 may include a cemented lens in which a positive meniscus lens convex toward the image side and a negative meniscus lens convex toward the image side are cemented in order from the object side.

Next, a zoom lens according to a second embodiment of the present invention will be described with reference to FIG. 5. FIG. 5 is a cross-sectional view illustrating a configuration and an optical path of the zoom lens according to the second embodiment of the present invention, and corresponds to Example 5 to be described later. An illustration method shown of FIG. 5 is similar to that of FIG. 1, and repeated description is omitted herein.

The lens groups constituting the zoom lens according to the second embodiment include, in order from the object side to the image side along the optical axis Z: a first lens group G1 that has a positive refractive power; a second lens group G2 that has a negative refractive power; a third lens group G3 that has a negative refractive power; a fourth lens group G4 that has a positive refractive power; a fifth lens group G5 that has a negative refractive power; and a sixth lens group G6 that has a positive refractive power.

In the example shown in FIG. 5, the first lens group G1 includes, in order from the object side, two lenses as lenses L11 and L12, the second lens group G2 includes, in order from the object side, three lenses as lenses L21 to L23, the third lens group G3 includes only a lens L31, the fourth lens group G4 includes, in order from the object side, five lenses as lenses L41 to L45, the fifth lens group G5 includes, in order from the object side, two lenses as lenses L51 and L52, and the sixth lens group G6 includes, in order from the object side, two lenses as lenses L61 and L62. However, the number of lenses constituting each lens group can be set to be different from that in the example shown in FIG. 5 as long as the number is within a range of the present invention.

FIG. 5 shows an example in which an optical member PP having a plane parallel plate shape is disposed on the image side of the lens system and a position of the image side surface of the optical member PP coincides with a position of the image plane Sim. The optical member PP of FIG. 5 is the same as the optical member PP shown in FIG. 1.

The zoom lens is configured such that all intervals between the lens groups adjacent to each other change during zooming. In the example of FIG. 5, the first to fifth lens groups G1 to G5 move during zooming, and the sixth lens group G6 remains stationary with respect to the image plane Sim. In FIG. 5, schematic movement loci of the lens groups moving during zooming from the wide-angle end to the telephoto end are indicated by arrows between the upper part and the lower part.

In the zoom lens, an aperture diaphragm St is disposed between a surface of the third lens group G3 closest to the image side and a surface of the fifth lens group G5 closest to the object side. In the example of FIG. 5, the aperture diaphragm St is disposed inside the fourth lens group G4, and the aperture diaphragm St moves integrally with the fourth lens group G4 during zooming. It should be noted that the aperture diaphragm St shown in FIG. 5 does not necessarily indicate its size and shape, and indicates a position of the diaphragm on the optical axis Z.

The zoom lens has arrangement of positive, negative, negative, positive, negative, and positive powers in order from the object side, the position of the aperture diaphragm St is set in the range, and all the intervals between the lens groups adjacent to each other is changed during zooming. Thereby, aberrations are satisfactorily corrected, and thus it is possible to realize a zoom lens having small fluctuation in F number during zooming. In particular, by adopting the power arrangement and setting the position of the aperture diaphragm St in the range, it becomes easy to minimize an amount of movement of the aperture diaphragm St during zooming. As a result, it becomes easy to reduce fluctuation in F number during zooming.

The first lens group G1 is formed to include two or less lenses, and the sixth lens group G6 is formed to include two or less lenses. With such a configuration, it is possible to avoid an increase in size of the lens system and an increase in weight thereof. In particular, by minimizing the number of lenses of the first lens group G1 in which lens diameters tend to increase, it becomes easy to achieve a small-size and lightweight configuration.

Further, a lens of the second lens group G2 closest to the object side is a meniscus lens which has a negative refractive power and of which an object side surface has a convex shape. A lens of the fifth lens group G5 closest to the image side is a meniscus lens which has a negative refractive power and of which an image side surface has a convex shape. With such a configuration, the aperture diaphragm St is disposed therebetween, whereby it is possible to enhance symmetry of the object-side and image-side lens configurations. Therefore, it is possible to suppress occurrence of coma aberration. As a result, there is an advantage in achieving the wide angle.

Hereinafter, preferred and available configurations of the zoom lens will be described. It is preferable that the zoom lens satisfies the following conditional expression (4).

$$-2.5 < fw \times \tan(\omega w)/R5r < -0.1 \qquad (4)$$

Here, fw is a focal length of the zoom lens at a wide-angle end,

ωw is a maximum half angle of view of the zoom lens at the wide-angle end, and

R5r is a radius of curvature of an image side surface of the lens closest to the image side in the fifth lens group.

The conditional expression (4) defines a ratio of a paraxial image height of the zoom lens at the wide-angle end to a radius of curvature of the image side surface of the negative meniscus lens of the fifth lens group G5 closest to the image side, and indicates a condition relating to suppression in occurrence of coma aberration at the wide-angle end. By not allowing the result of the conditional expression (4) to be equal to or less than the lower limit, it becomes easy to prevent coma aberration at the wide-angle end from being excessively corrected. By not allowing the result of the conditional expression (4) to be equal to or greater than the upper limit, it becomes easy to prevent coma aberration at the wide-angle end from being insufficiently corrected. By making the zoom lens satisfy the conditional expression (4), it becomes easy to satisfactorily suppress occurrence of coma aberration at the wide-angle end.

In order to enhance the effect of the conditional expression (4), it is more preferable that the following conditional expression (4-1) is satisfied, and it is yet more preferable that the following conditional expression (4-2) is satisfied.

$$-1.5 < fw \times \tan(\omega w)/R5r < -0.3 \quad (4\text{-}1)$$

$$-1.3 < fw \times \tan(\omega w)/R5r < -0.7 \quad (4\text{-}2)$$

It is preferable that the zoom lens satisfies the following conditional expression (5).

$$0.1 < (R5r - R5f)/(R5r + R5f) < 0.9 \quad (5)$$

Here, R5r is a radius of curvature of an image side surface of the lens closest to the image side in the fifth lens group, and R5f is a radius of curvature of an object side surface of the lens closest to the image side in the fifth lens group.

The conditional expression (5) defines a shape factor of the negative meniscus lens of the fifth lens group G5 closest to the image side in the zoom lens, and indicates a condition relating to correction for fluctuation in coma aberration caused by zooming. By not allowing the result of the conditional expression (5) to be equal to or less than the lower limit, it becomes easy to prevent coma aberration from being insufficiently corrected. By not allowing the result of the conditional expression (5) to be equal to or greater than the upper limit, it becomes easy to prevent coma aberration from being excessively corrected.

In order to enhance the effect of the conditional expression (5), it is more preferable that the following conditional expression (5-1) is satisfied, and it is yet more preferable that the following conditional expression (5-2) is satisfied.

$$0.13 < (R5r - R5f)/(R5r + R5f) < 0.8 \quad (5\text{-}1)$$

$$0.15 < (R5r - R5f)/(R5r + R5f) < 0.6 \quad (5\text{-}2)$$

It is preferable that the zoom lens satisfies the following conditional expression (6).

$$-0.35 < f5/f1 < -0.10 \quad (6)$$

Here, f5 is a focal length of the fifth lens group, and
f1 is a focal length of the first lens group.

The conditional expression (6) defines a ratio of the focal length of the fifth lens group G5 to the focal length of the first lens group G1. By not allowing the result of the conditional expression (6) to be equal to or less than the lower limit, it is possible to prevent the refractive power of the first lens group G1 from being excessive with respect to the refractive power of the fifth lens group G5. As a result, it becomes easy to suppress occurrence of curvature of field. By not allowing the result of the conditional expression (6) to be equal to or greater than the upper limit, it is possible to prevent the refractive power of the first lens group G1 from being insufficient with respect to the refractive power of the fifth lens group G5. As a result, it is possible to prevent the size of the first lens group G1 from increasing.

In order to enhance the effect relating to the conditional expression (6), it is more preferable that the following conditional expression (6-1) is satisfied.

$$-0.3 < f5/f1 < -0.2 \quad (6\text{-}1)$$

In the zoom lens, it is preferable that an aspheric resin is attached to at least one of the object side surface and the image side surface of the lens of the second lens group G2 closest to the object side. Further, it is preferable that in the second lens group G2, at least one group of cemented lenses, each of which is formed by cementing a negative lens and a positive lens, is provided. Operational effects obtained with such a configuration are as described above in the description of the first embodiment.

Regarding focusing, by moving only the third lens group G3, focusing may be performed. In such a case, it is possible to realize a focusing system capable of minimizing the weights of the lenses moving during focusing while suppressing fluctuation in aberrations caused by the imaging distance.

It is preferable that a lens of the fourth lens group G4 closest to the object side is a positive lens, and a lens of the fourth lens group G4 closest to the image side is a positive lens. In such a case, it is possible to satisfactorily correct spherical aberration while suppressing occurrence of aberrations in the peripheral portion of the imaging area.

The sixth lens group G6 may be formed to move during zooming, and may be formed to remain stationary with respect to the image plane Sim during zooming. In a case where the sixth lens group G6 moves during zooming, it becomes easy to reduce fluctuation in aberrations during zooming. In a case where the sixth lens group G6 remains stationary during zooming, it is possible to further simplify a mechanical configuration of the apparatus. As a result, there is an advantage in reducing the size of the apparatus.

The respective lens groups may have the following configurations, for example. The first lens group G1 may include, in order from the object side, a cemented lens in which a negative meniscus lens convex toward the object side and a positive meniscus lens convex toward the object side are cemented. The second lens group G2 may include, in order from the object side: a negative meniscus lens of which an image side surface has an aspheric resin attached thereto and which is convex toward the object side; and a cemented lens in which a biconcave lens and a biconvex lens are cemented in order from the object side. The third lens group G3 may includes only a negative meniscus lens which is convex toward the image side. Lenses constituting the fourth lens group G4 may include, in order from the object side: a biconvex lens; a biconcave lens; a negative lens which is concave toward the image side; and a cemented lens in which a negative meniscus lens convex toward the object side and a biconvex lens are cemented in order from the object side. Each of the first to third lenses of the fourth lens group G4 from the object side may be formed as a single no-cemented lens. The fifth lens group G5 may include, in order from the object side: a negative meniscus lens which is convex toward the object side; and a negative meniscus lens which is convex toward the image side. The sixth lens group G6 may include a cemented lens in which a positive meniscus lens convex toward the image side and a negative meniscus lens convex toward the image side are cemented in order from the object side.

It should be noted that the above-mentioned preferred and available configurations according to first and second embodiments may be arbitrary combinations in the embodiments, and it is preferable to selectively adopt the configurations in accordance with required specification. According to the first and second embodiments of the present invention, it is possible to achieve a zoom lens which has high optical performance by satisfactorily correcting coma aberration while keeping a size thereof small and keeping fluctuation in F number small during zooming with a wide angle. It should be noted that the "wide angle" described herein means that the total angle of view at the wide-angle end is greater than 75°.

Next, numerical examples of the zoom lens of the present invention will be described. Among the examples described below, Examples 1 to 4 correspond to the first embodiment, and Example 5 corresponds to the second embodiment.

Example 1

A lens configuration of a zoom lens of Example 1 is shown in FIG. 1, and an illustration method and a configuration thereof are as described above in the examples shown in FIG. 1. Therefore, repeated description is omitted herein.

Table 1 shows basic lens data of the zoom lens of Example 1, Table 2 shows specification and variable surface spacings, and Table 3 shows aspheric coefficients thereof. In Table 1, the column of Si shows i-th (i=1, 2, 3, . . . ) surface number. The i-th surface number is attached to each of surfaces of the elements, where i sequentially increases toward the image side when an object side surface of an element closest to the object side is regarded as a first surface. The column of Ri shows a radius of curvature of the i-th surface. The column of Di shows a surface spacing on the optical axis Z between the i-th surface and an (i+1)th surface. In Table 1, the column of Ndj shows a refractive index of a j-th (j=1, 2, 3, . . . ) element at the d line (a wavelength of 587.6 nm), where j sequentially increases toward the image side when the element closest to the object side is regarded as the first element. The column of vdj shows an Abbe number of the j-th element on the basis of the d line. The rays shown in FIG. 1 are rays in a case where a light blocking member provided with a circular aperture portion centered on a point on the optical axis is disposed at a position on a predetermined surface. The column of radius of aperture in Table 1 shows the position of the light blocking member and a radius of the aperture portion.

Here, signs of radii of curvature of surface shapes convex toward the object side are set to be positive, and signs of radii of curvature of surface shapes convex toward the image side are set to be negative. Table 1 additionally shows the aperture diaphragm St and the optical member PP. In Table 1, in a place of a surface number of a surface corresponding to the aperture diaphragm St, the surface number and a term of (St) are noted. A value at the bottom place of Di indicates a spacing between the image plane Sim and the surface closest to the image side in the table. In Table 1, the variable surface spacings, which are variable during zooming, are referenced by the reference signs DD[ ], and are written into places of Di, where object side surface numbers of spacings are noted in [ ].

Table 2 shows values of the zoom ratio Zr, the focal length f of the whole system, the F number FNo., the maximum total angle of view 2ω, and the variable surface spacing, on the basis of d line. (°) in the place of 2ω indicates that the unit thereof is a degree. In Table 2, values at the wide-angle end, the middle focal length state, and the telephoto end are respectively shown in the columns labeled by WIDE, MIDDLE, and TELE. The values of the data of Table 1 and variable surface spacings of Table 2 are values in a state where the object at infinity is in focus.

In Table 1, the reference sign * is attached to surface numbers of aspheric surfaces, and numerical values of the paraxial radius of curvature are written into the column of the radius of curvature of the aspheric surface. Table 3 shows aspheric coefficients of the aspheric surfaces of Example 1. The "E-n" (n: an integer) in numerical values of the aspheric coefficients of Table 3 indicates "×10$^{-n}$". The aspheric coefficients are values of the coefficients KA and Am (m=3, 4, 5, . . . 16) in aspheric surface expression represented as the following expression.

$$Zd = \frac{C \times h^2}{1 + \sqrt{1 - KA \times C^2 \times h^2}} + \sum_m Am \times h^m$$

Here, Zd is an aspheric surface depth (a length of a perpendicular from a point on an aspheric surface at height h to a plane that is perpendicular to the optical axis and contacts with the vertex of the aspheric surface), h is a height (a distance from the optical axis to the lens surface), C is a paraxial curvature, and KA and Am are aspheric coefficients.

In data of each table, a degree is used as a unit of an angle, and mm is used as a unit of a length, but appropriate different units may be used since the optical system can be used even in a case where the system is enlarged or reduced in proportion. Further, the following each table describes numerical values rounded off to predetermined decimal places.

TABLE 1

Example 1

| Si | Ri | Di | Ndj | vdj | RADIUS OF APERTURE |
|---|---|---|---|---|---|
| 1 | 72.8512 | 1.7000 | 1.89286 | 20.36 | |
| 2 | 50.7400 | 7.9000 | 1.83481 | 42.72 | |
| 3 | 169.0838 | DD[3] | | | 27.53 |
| 4 | 91.2814 | 1.3500 | 1.81600 | 46.62 | |
| 5 | 20.5810 | 0.4900 | 1.51876 | 54.04 | |
| *6 | 18.5803 | 13.2600 | | | |
| 7 | −69.4164 | 1.2400 | 1.54072 | 47.23 | 14.20 |
| 8 | 34.4260 | 5.3800 | 1.85478 | 24.80 | |
| 9 | −196.2662 | 7.2745 | | | |
| 10 | −39.5658 | 1.2000 | 1.63930 | 44.87 | |
| 11 | −103.4169 | DD[11] | | | 10.40 |
| 12 | 22.2321 | 6.0800 | 1.43875 | 94.66 | |
| 13 | −49.9058 | 1.9073 | | | |
| 14 (St) | ∞ | 3.9900 | | | |
| *15 | −162.4825 | 1.9600 | 1.58313 | 59.38 | |
| *16 | 263.0760 | 2.5200 | | | |
| 17 | ∞ | 1.3000 | 1.69895 | 30.13 | |
| 18 | 51.9325 | 3.1846 | | | 9.60 |
| 19 | 50.4139 | 1.4200 | 1.53172 | 48.84 | |
| 20 | 28.2600 | 8.2600 | 1.49700 | 81.54 | |
| 21 | −20.8423 | DD[21] | | | 11.44 |
| *22 | 78.5812 | 4.8500 | 1.58313 | 59.38 | |

TABLE 1-continued

Example 1

| Si | Ri | Di | Ndj | vdj | RADIUS OF APERTURE |
|---|---|---|---|---|---|
| *23 | 37.6117 | 13.4200 | | | 12.12 |
| 24 | −17.4832 | 1.2000 | 1.85026 | 32.27 | |
| 25 | −26.0440 | DD[25] | | | |
| 26 | −100.9926 | 5.2700 | 1.91082 | 35.25 | |
| 27 | −47.4212 | 25.8035 | | | |
| 28 | ∞ | 3.2500 | 1.51680 | 64.20 | |
| 29 | ∞ | 0.0000 | | | |

TABLE 2

Example 1

| | WIDE | MIDDLE | TELE |
|---|---|---|---|
| Zr | 1.0 | 1.4 | 1.9 |
| f | 32.93 | 45.27 | 62.24 |
| FNo. | 4.12 | 4.12 | 4.12 |
| 2ω (°) | 79.4 | 61.0 | 46.4 |
| DD [3] | 0.63 | 7.56 | 21.06 |
| DD [11] | 13.58 | 6.61 | 1.73 |
| DD [21] | 2.11 | 3.56 | 4.97 |
| DD [25] | 1.00 | 10.85 | 18.98 |

TABLE 3

Example 1

| | SURFACE NUMBER | | |
|---|---|---|---|
| | 6 | 15 | 16 |
| KA | 6.3914607E−01 | 2.0444902E+00 | −4.8176737E+00 |
| A3 | 0.0000000E+00 | 0.0000000E+00 | 0.0000000E+00 |
| A4 | −3.9131873E−06 | −5.2024485E−06 | −8.6421047E−06 |
| A5 | 4.5804164E−06 | −2.7661214E−06 | −1.6968009E−06 |
| A6 | −3.1297225E−06 | 7.5084016E−07 | 1.3758671E−07 |
| A7 | 9.4449056E−07 | 1.2757000E−08 | 2.3656995E−07 |
| A8 | −1.5568669E−07 | −2.0219615E−08 | −4.9230907E−08 |
| A9 | 1.4171414E−08 | 2.7042830E−09 | 8.3812853E−10 |
| A10 | −5.7106822E−10 | −7.6987177E−11 | 1.1346146E−09 |
| A11 | −7.9068908E−12 | −1.4247514E−11 | −1.7021691E−10 |
| A12 | 1.1114447E−12 | 2.2494370E−12 | 3.7163422E−12 |
| A13 | 5.8869099E−14 | −3.0551706E−13 | 1.5386536E−12 |
| A14 | −8.6533992E−15 | 3.2364995E−14 | −1.9495772E−13 |
| A15 | 3.3406257E−16 | −1.7933891E−15 | 1.0133432E−14 |
| A16 | −4.5375705E−18 | 3.8285431E−17 | −2.0715032E−16 |

| | SURFACE NUMBER | |
|---|---|---|
| | 22 | 23 |
| KA | −3.5044309E−00 | 3.9019706E−01 |
| A3 | 0.0000000E+00 | 0.0000000E+00 |
| A4 | 7.4535777E−06 | 1.1844063E−05 |
| A5 | −9.1821053E−07 | −2.2795946E−06 |
| A6 | −2.4598177E−08 | 2.0258403E−07 |
| A7 | 2.3689478E−08 | 4.9969989E−08 |
| A8 | 3.7426690E−10 | −1.4814706E−08 |
| A9 | −3.6042983E−10 | 1.3215336E−09 |
| A10 | 1.7103438E−13 | 8.2362757E−11 |
| A11 | 6.4767682E−12 | −2.5026104E−11 |
| A12 | −8.0354289E−13 | 1.3313954E−12 |
| A13 | 4.7122771E−14 | 6.5305118E−14 |
| A14 | −1.2339622E−15 | −9.6886207E−15 |
| A15 | −4.4927986E−18 | 3.6316399E−16 |
| A16 | 6.6243103E−19 | −4.4122167E−18 |

FIGS. 6 to 9 show aberration diagrams in a state where the object at infinity is in focus through the zoom lens of Example 1. Further, in FIG. 6, spherical aberration, astigmatism, distortion, and lateral chromatic aberration (chromatic aberration of magnification) are shown in order from the left. FIG. 6 shows aberration diagrams at the wide-angle end in the upper part indicated by WIDE, shows aberration diagrams at the middle focal length state in the middle part indicated by MIDDLE, and shows spherical aberration, aberration diagrams at the telephoto end in the lower part indicated by TELE. In the spherical aberration diagram, aberrations at the d line (a wavelength of 587.6 nm), the C line (a wavelength of 656.3 nm), and the F line (a wavelength of 486.1 nm) are respectively indicated by the solid line, the long dashed line, and the short dashed line. In the astigmatism diagram, aberrations in the sagittal and tangential directions at the d line are respectively indicated by the solid line and the short dashed line. In the distortion diagram, aberration at the d line is indicated by the solid line. In the lateral chromatic aberration, aberrations at the C line and the F line are respectively indicated by the long dashed line and the short dashed line. In the spherical aberration diagram, FNo. indicates an F number. In the other aberration diagrams, ω indicates a half angle of view.

Figure 7:
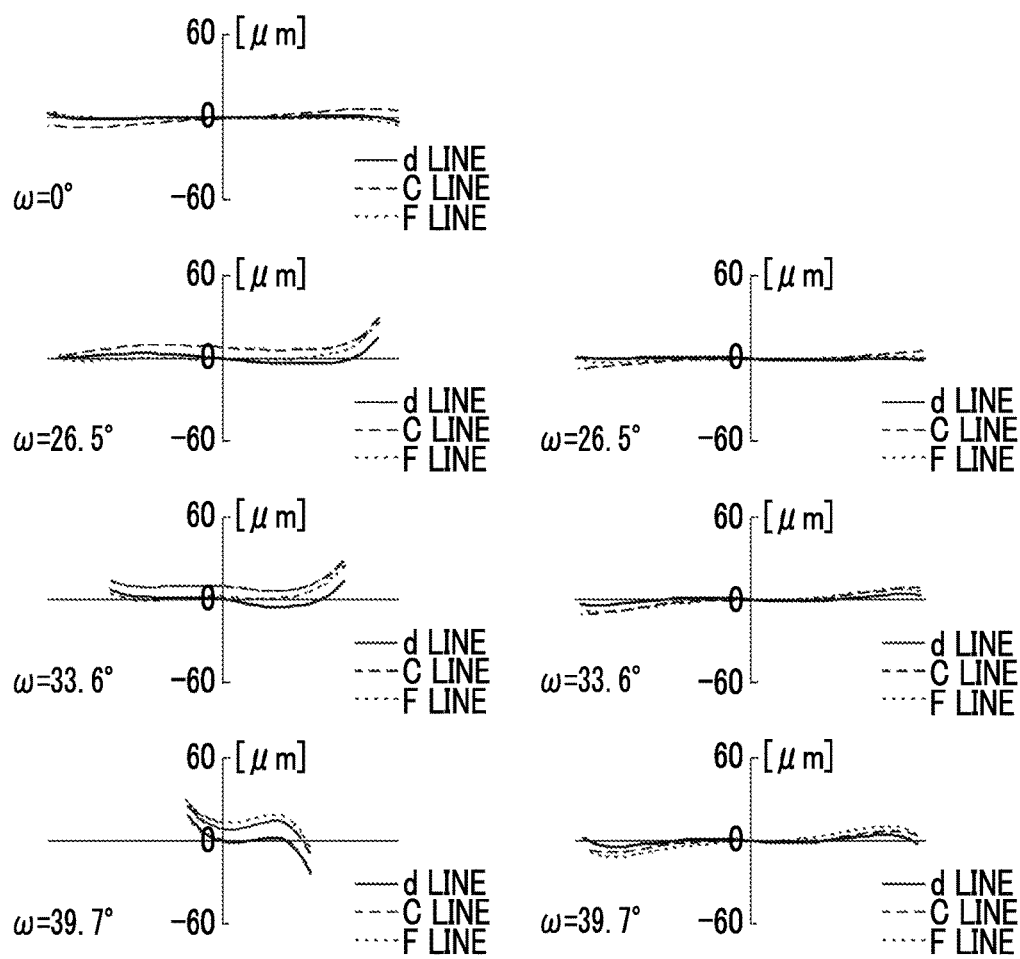
FIG. 7 shows lateral aberration diagrams at the wide-angle end of the zoom lens of Example 1 of the present invention.
Figure 8:
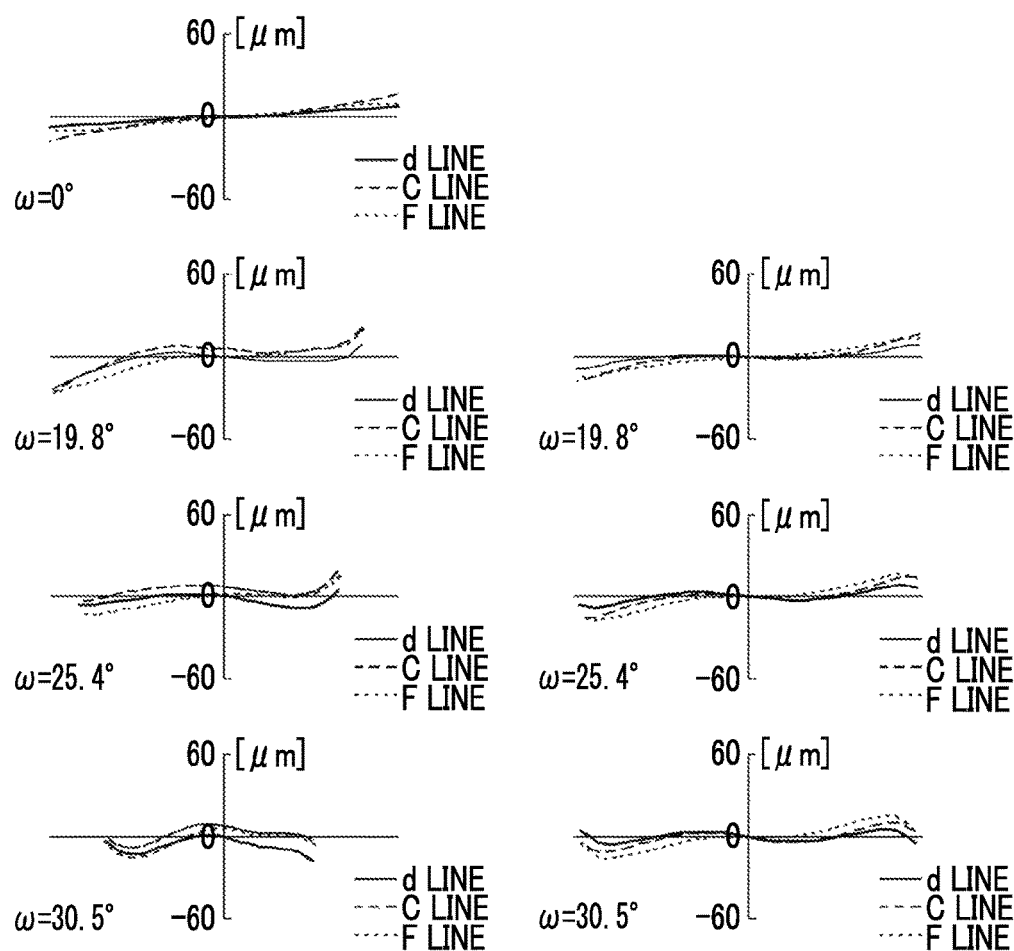
FIG. 8 shows lateral aberration diagrams at the middle focal length state of the zoom lens of Example 1 of the present invention.
Figure 9:
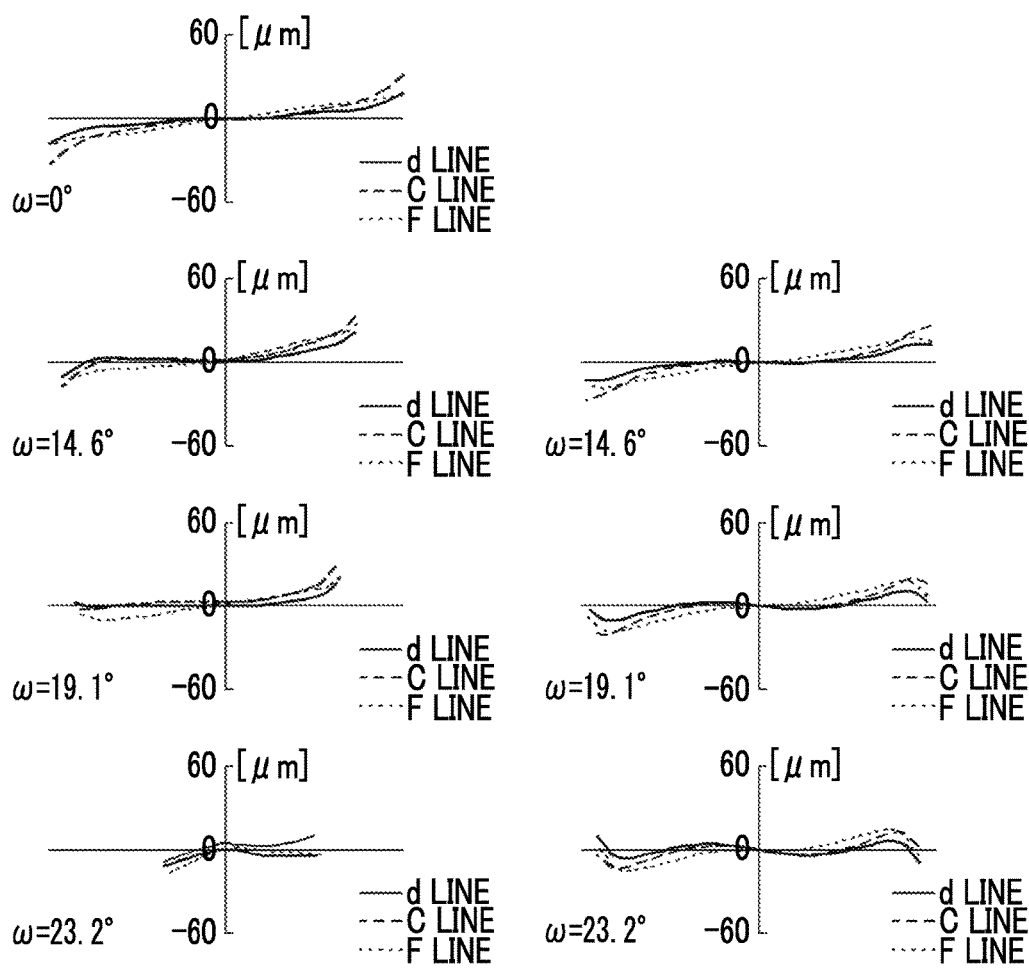
FIG. 9 shows lateral aberration diagrams at the telephoto end of the zoom lens of Example 1 of the present invention.
Figure 10:
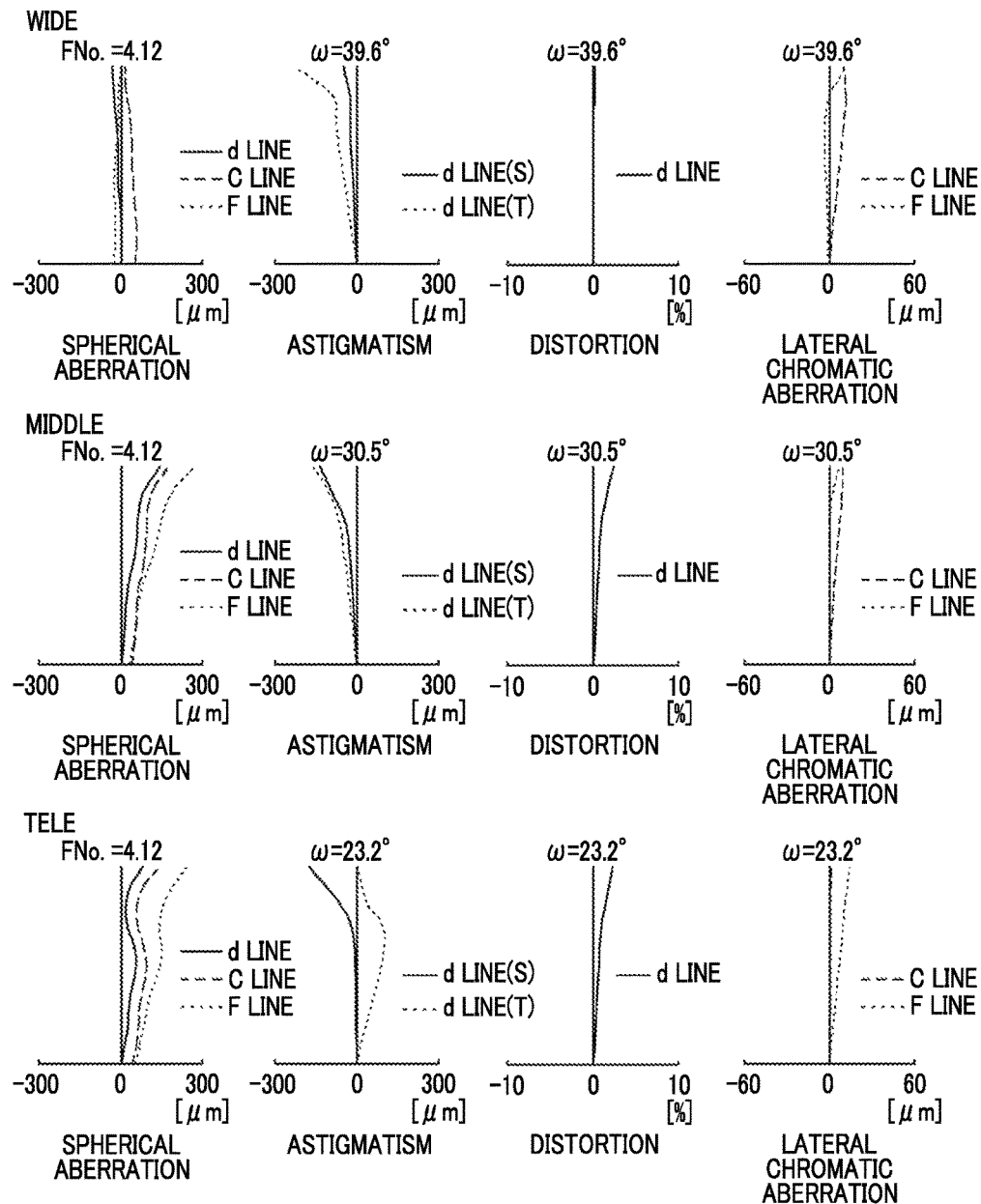
FIG. 10 shows spherical aberration diagrams, astigmatism diagrams, distortion diagrams, lateral chromatic aberration diagrams of the zoom lens of Example 2 of the present invention.
Figure 11:
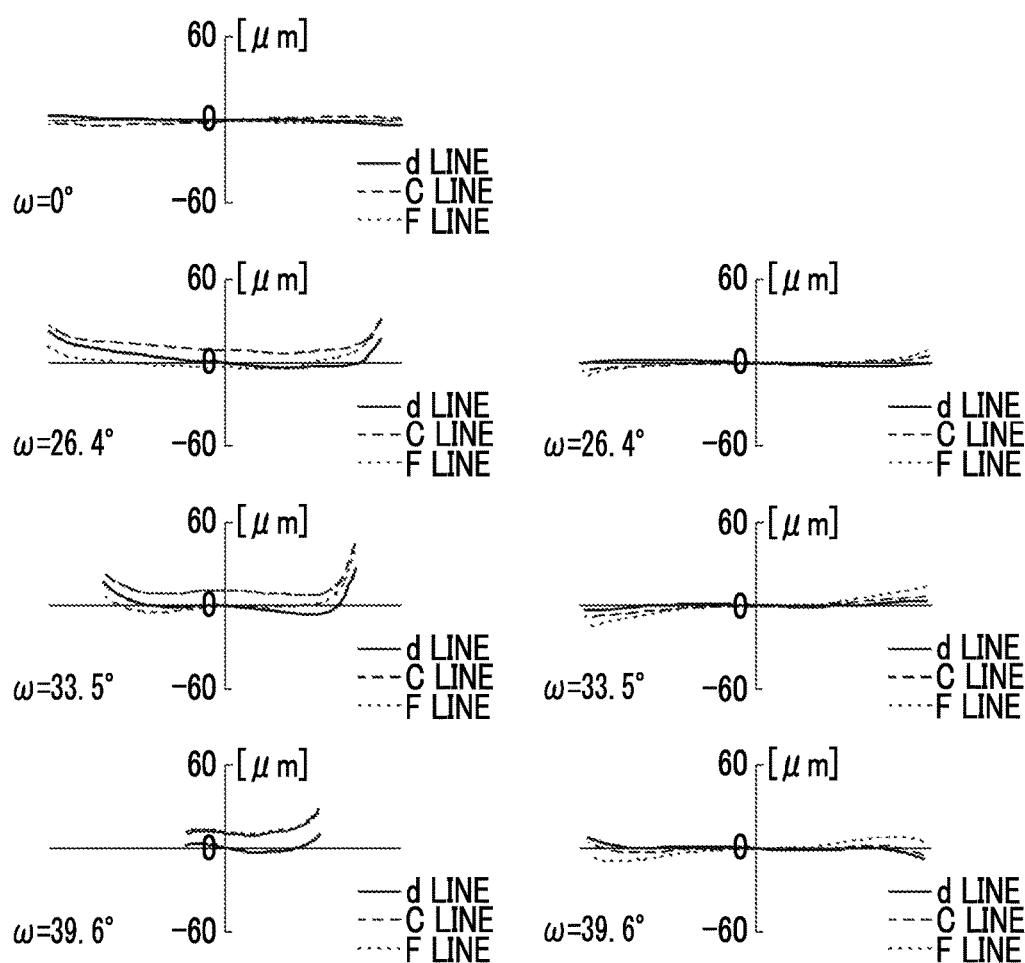
FIG. 11 shows lateral aberration diagrams at the wide-angle end of the zoom lens of Example 2 of the present invention.
Figure 12:
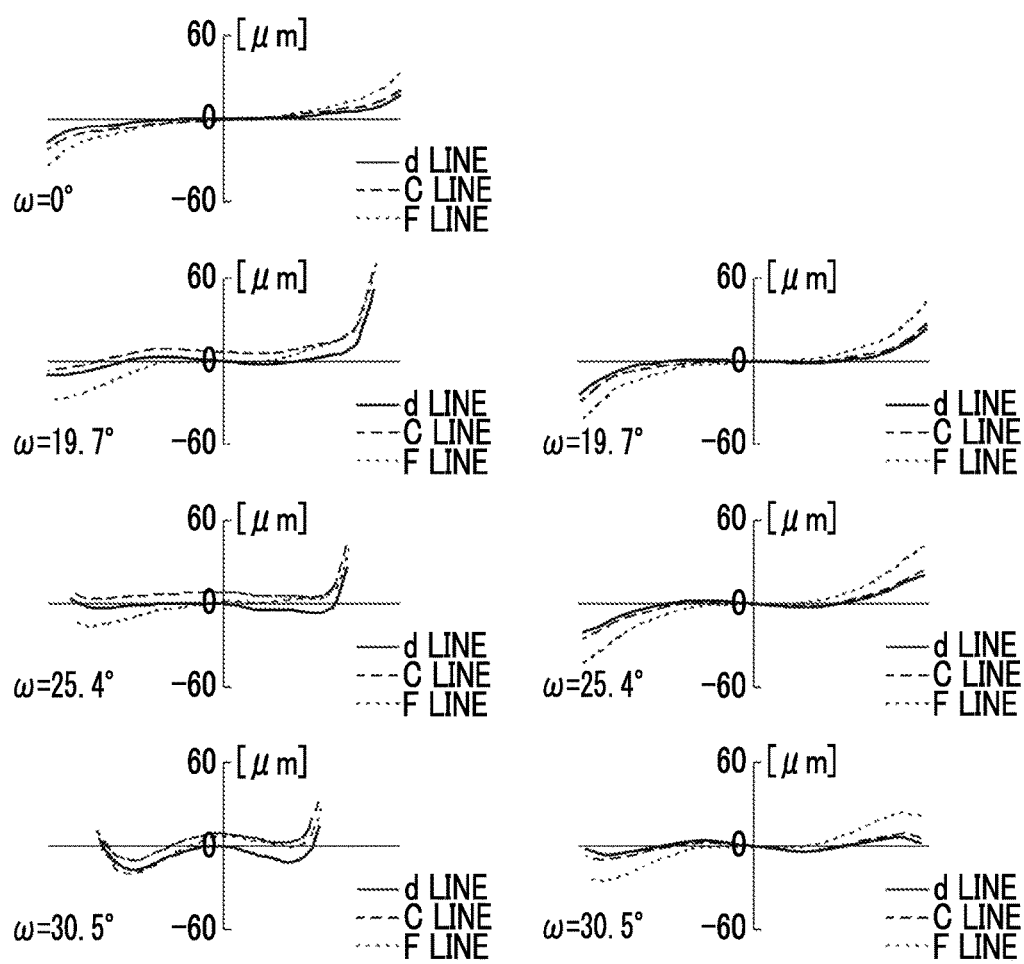
FIG. 12 shows lateral aberration diagrams at the middle focal length state of the zoom lens of Example 2 of the present invention.
Figure 13:
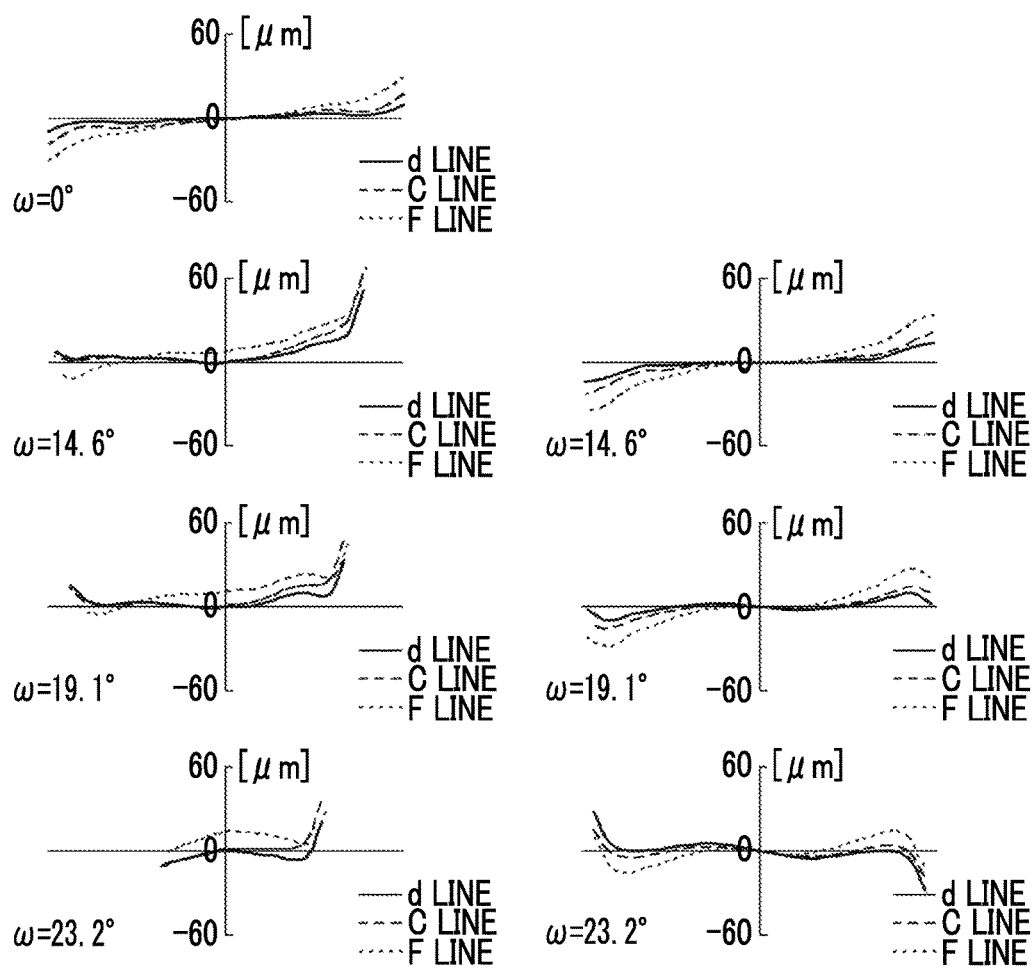
FIG. 13 shows lateral aberration diagrams at the telephoto end of the zoom lens of Example 2 of the present invention.
Figure 14:
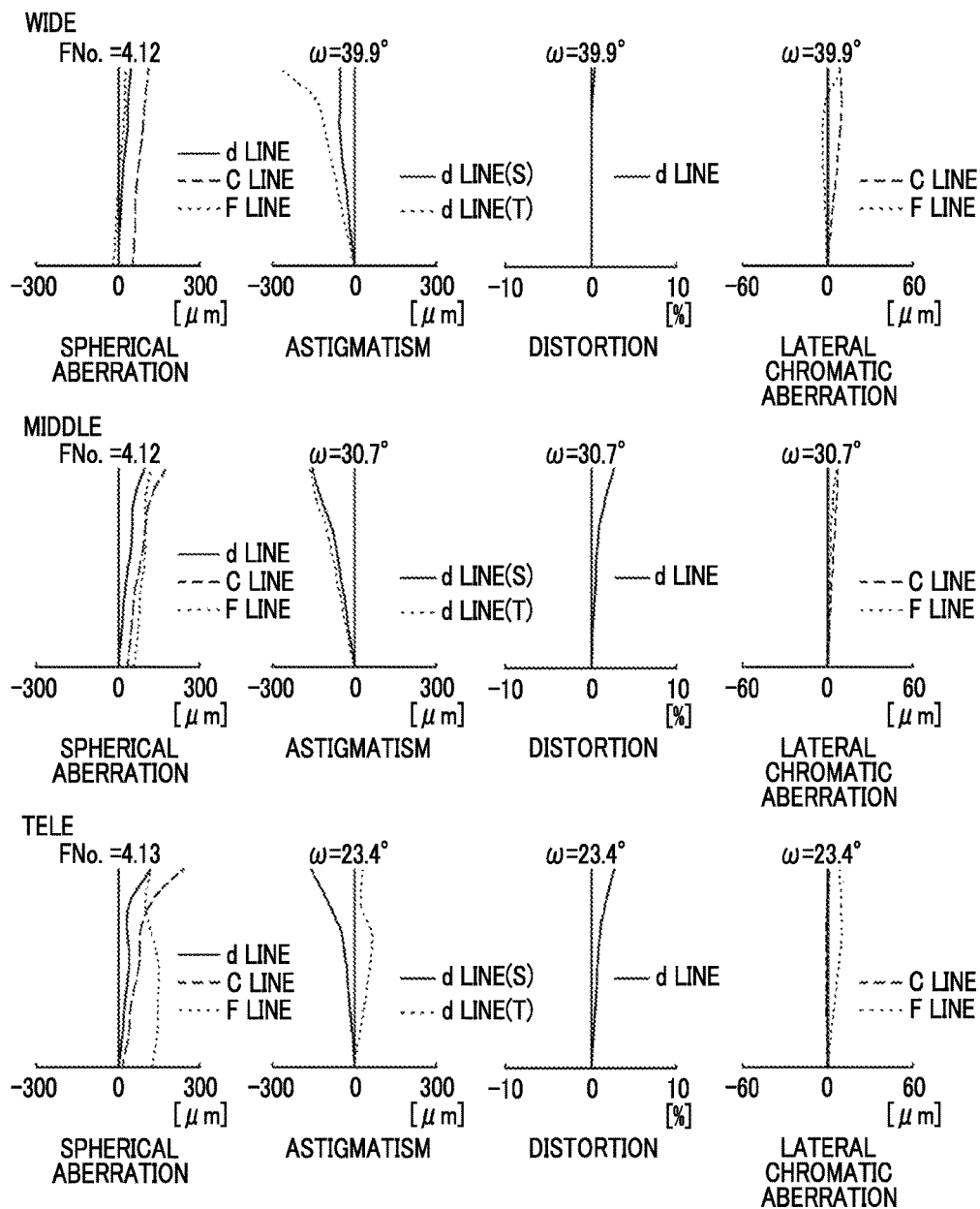
FIG. 14 shows spherical aberration diagrams, astigmatism diagrams, distortion diagrams, lateral chromatic aberration diagrams of the zoom lens of Example 3 of the present invention.
Figure 15:
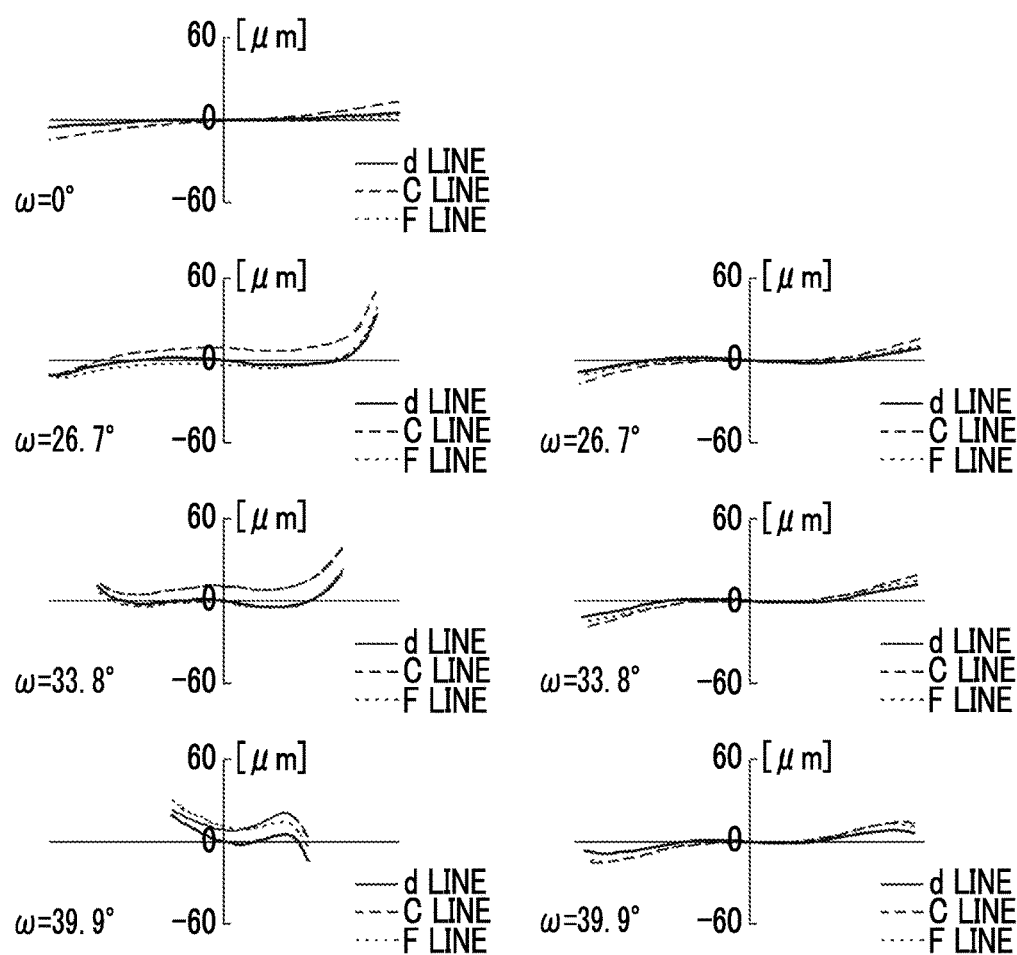
FIG. 15 shows lateral aberration diagrams at the wide-angle end of the zoom lens of Example 3 of the present invention.
Figure 16:
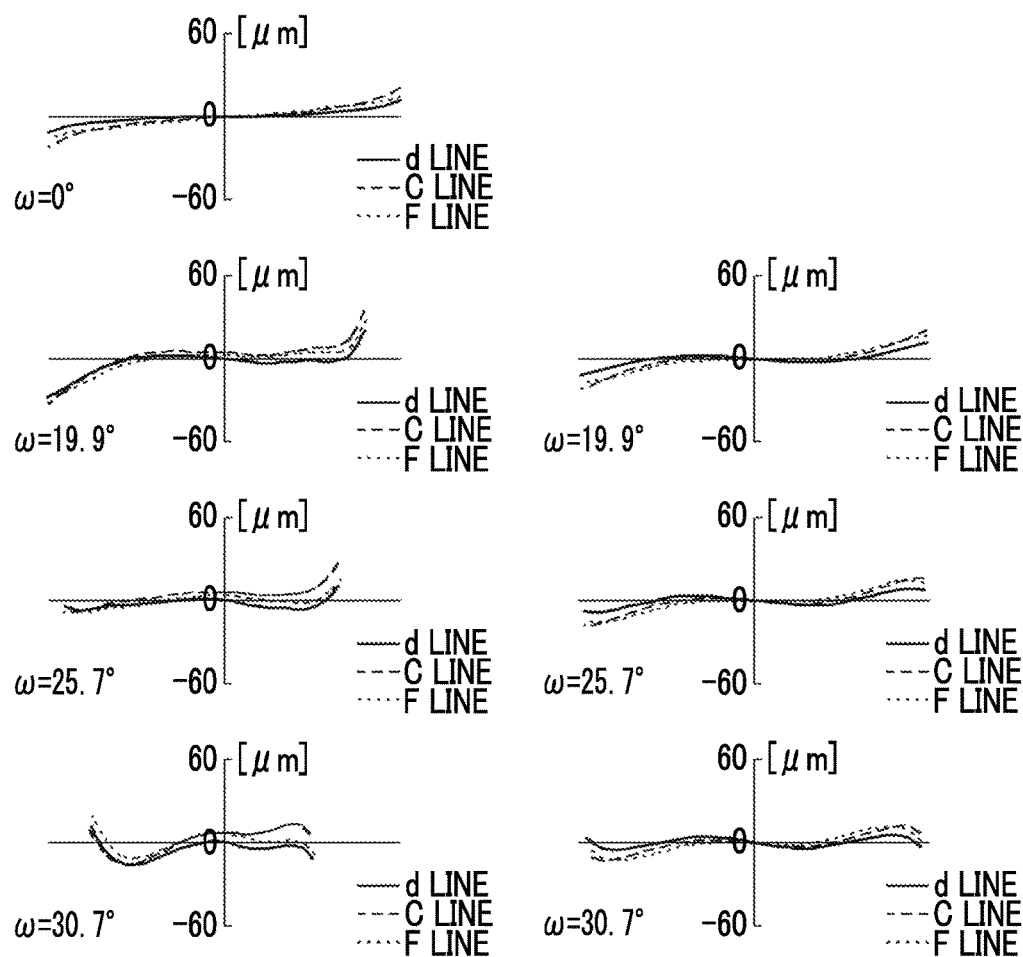
FIG. 16 shows lateral aberration diagrams at the middle focal length state of the zoom lens of Example 3 of the present invention.
Figure 17:
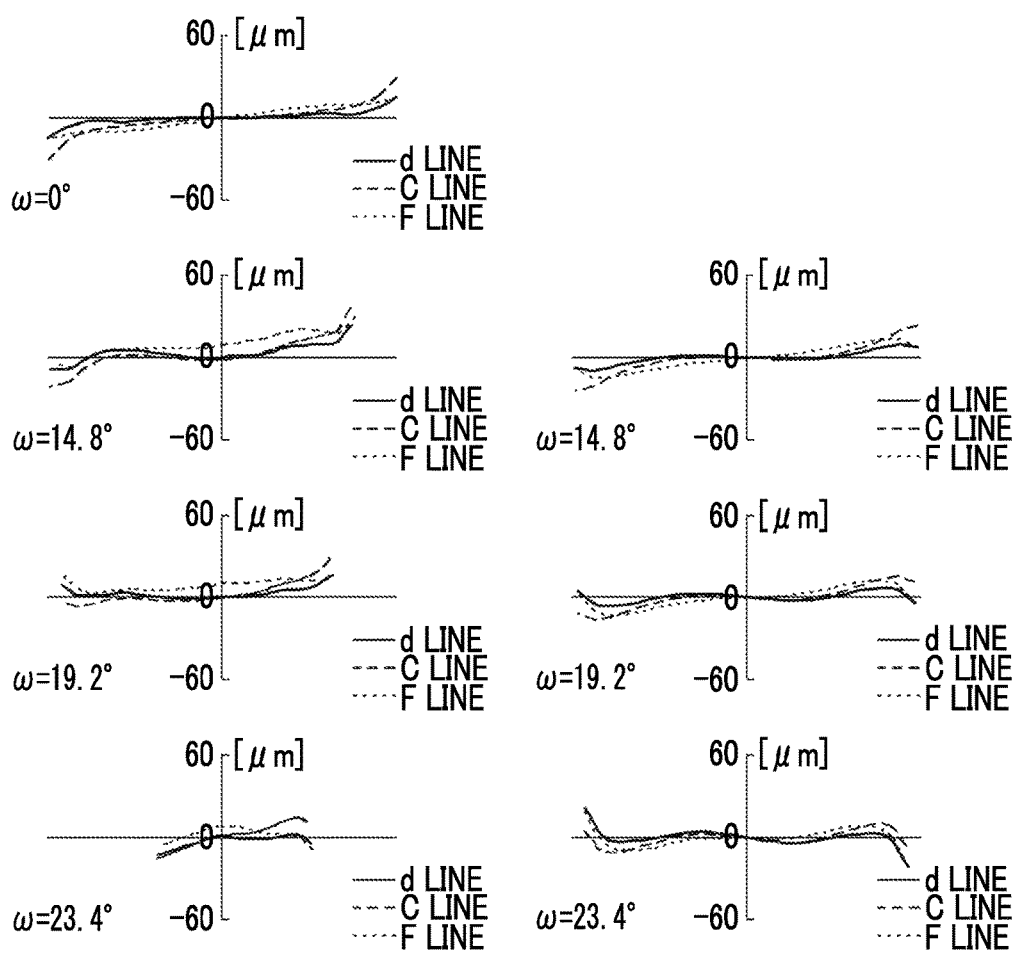
FIG. 17 shows lateral aberration diagrams at the telephoto end of the zoom lens of Example 3 of the present invention.
Figure 18:
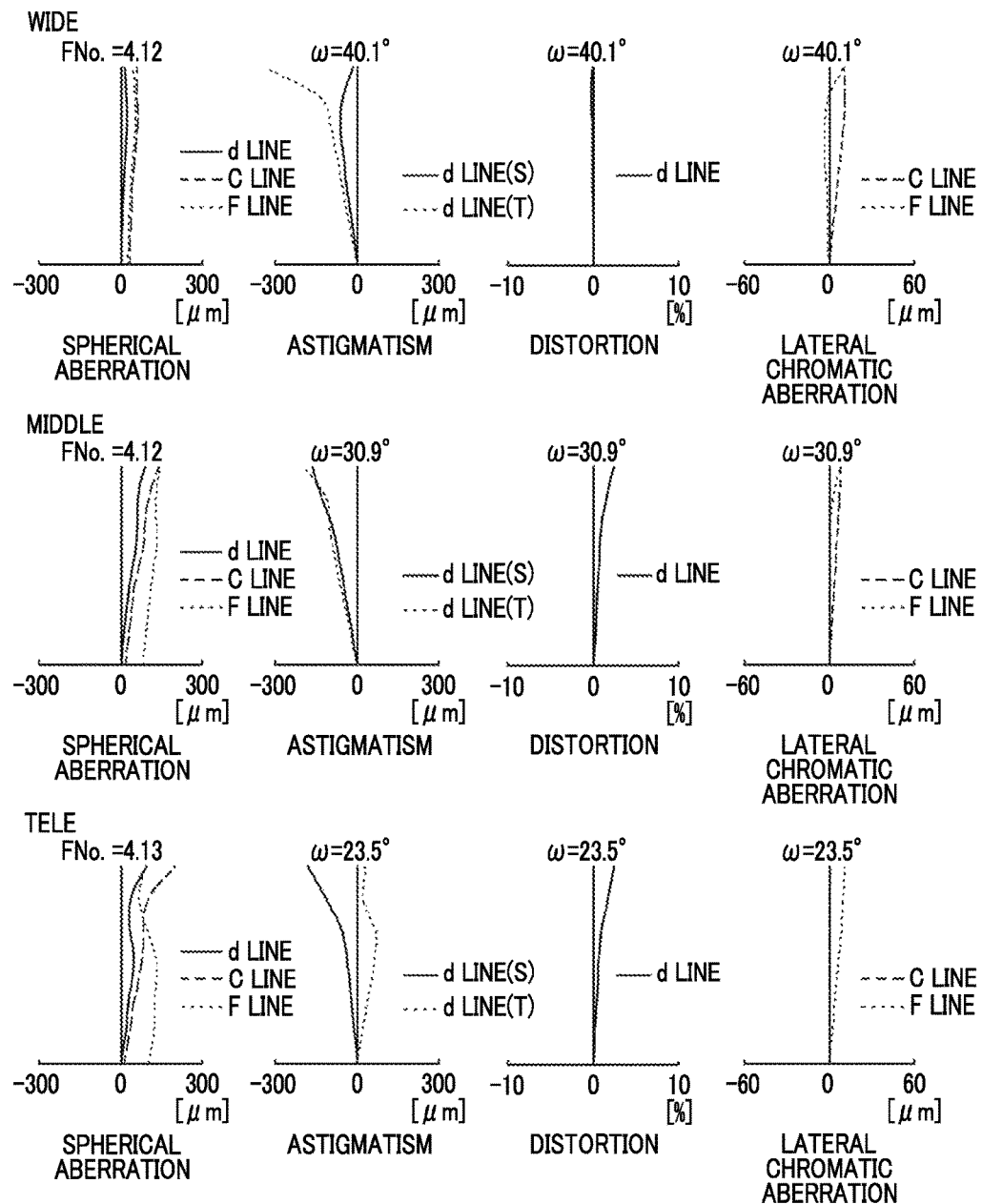
FIG. 18 shows spherical aberration diagrams, astigmatism diagrams, distortion diagrams, lateral chromatic aberration diagrams of the zoom lens of Example 4 of the present invention.
Figure 19:
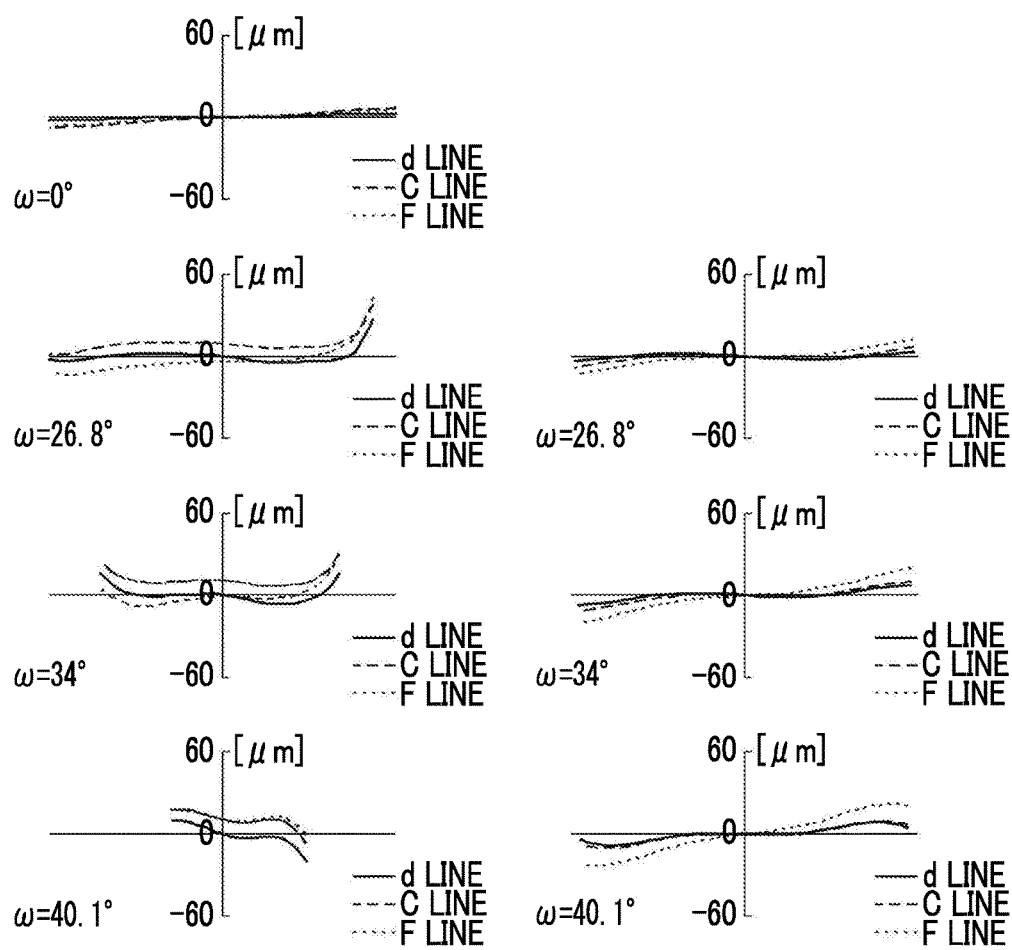
FIG. 19 shows lateral aberration diagrams at the wide-angle end of the zoom lens of Example 4 of the present invention.
Figure 20:
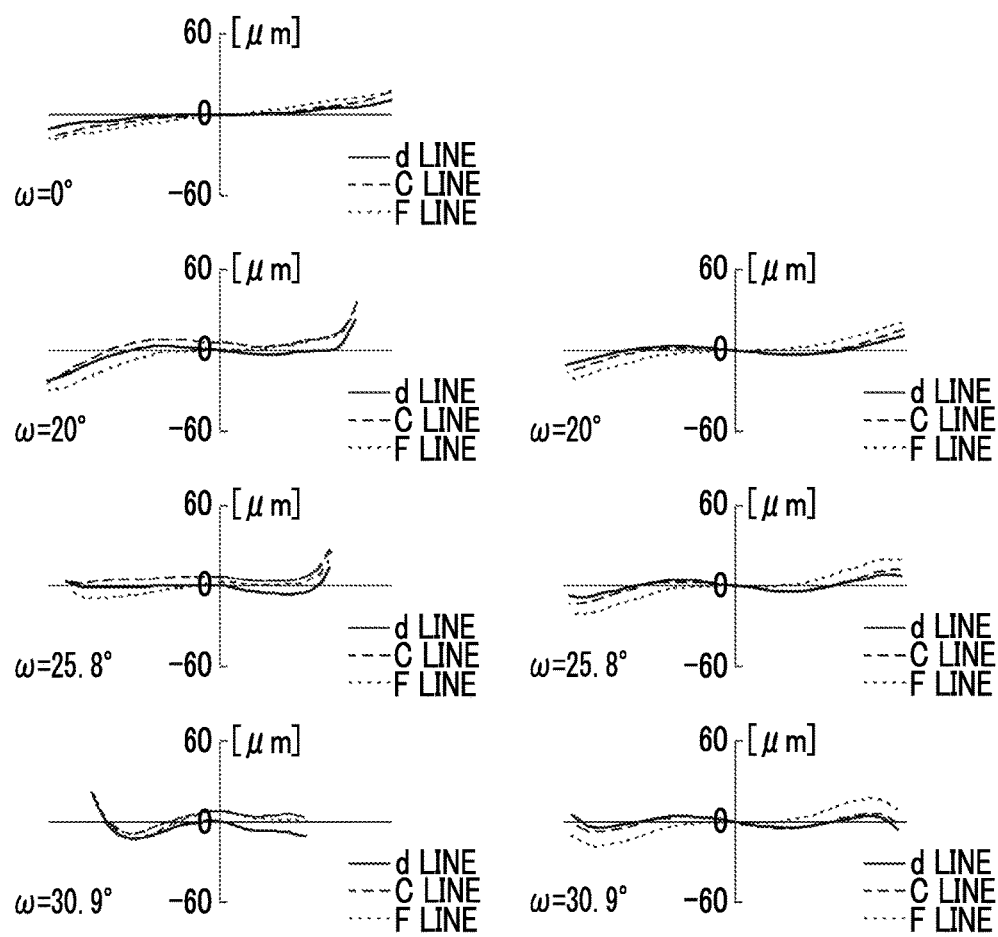
FIG. 20 shows lateral aberration diagrams at the middle focal length state of the zoom lens of Example 4 of the present invention.
Figure 21:
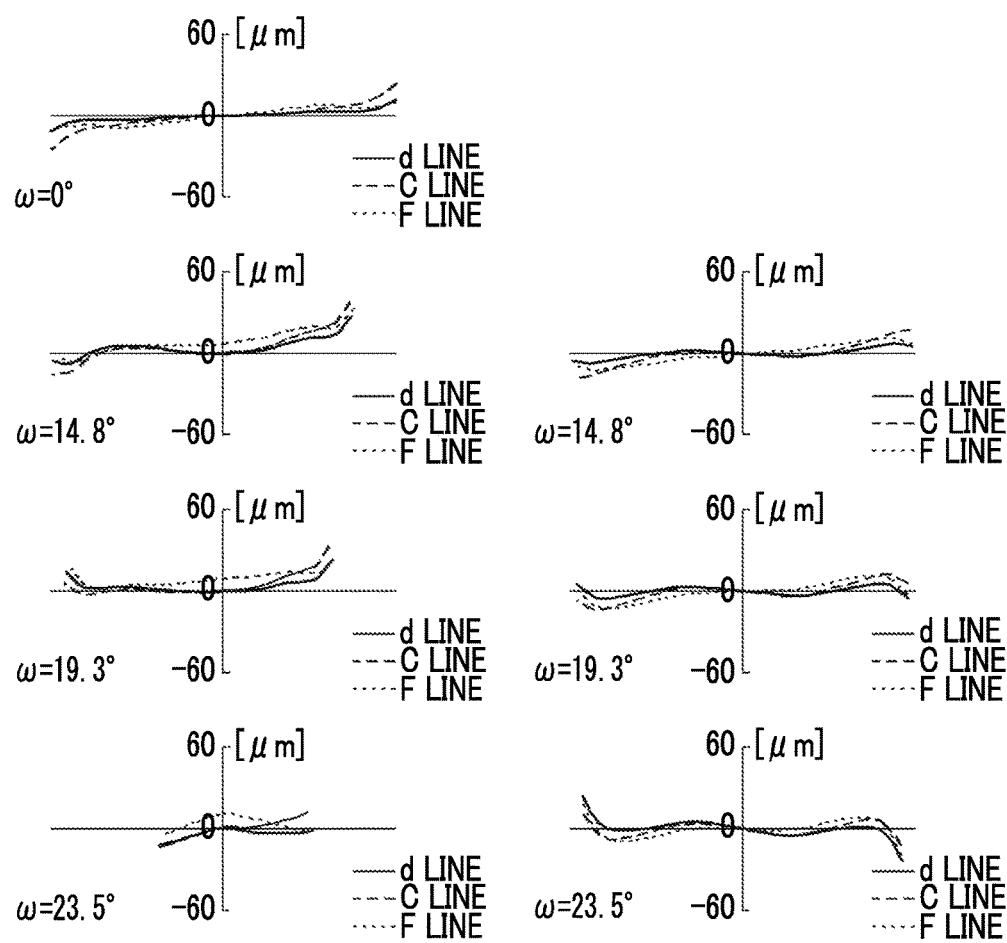
FIG. 21 shows lateral aberration diagrams at the telephoto end of the zoom lens of Example 4 of the present invention.
Figure 22:
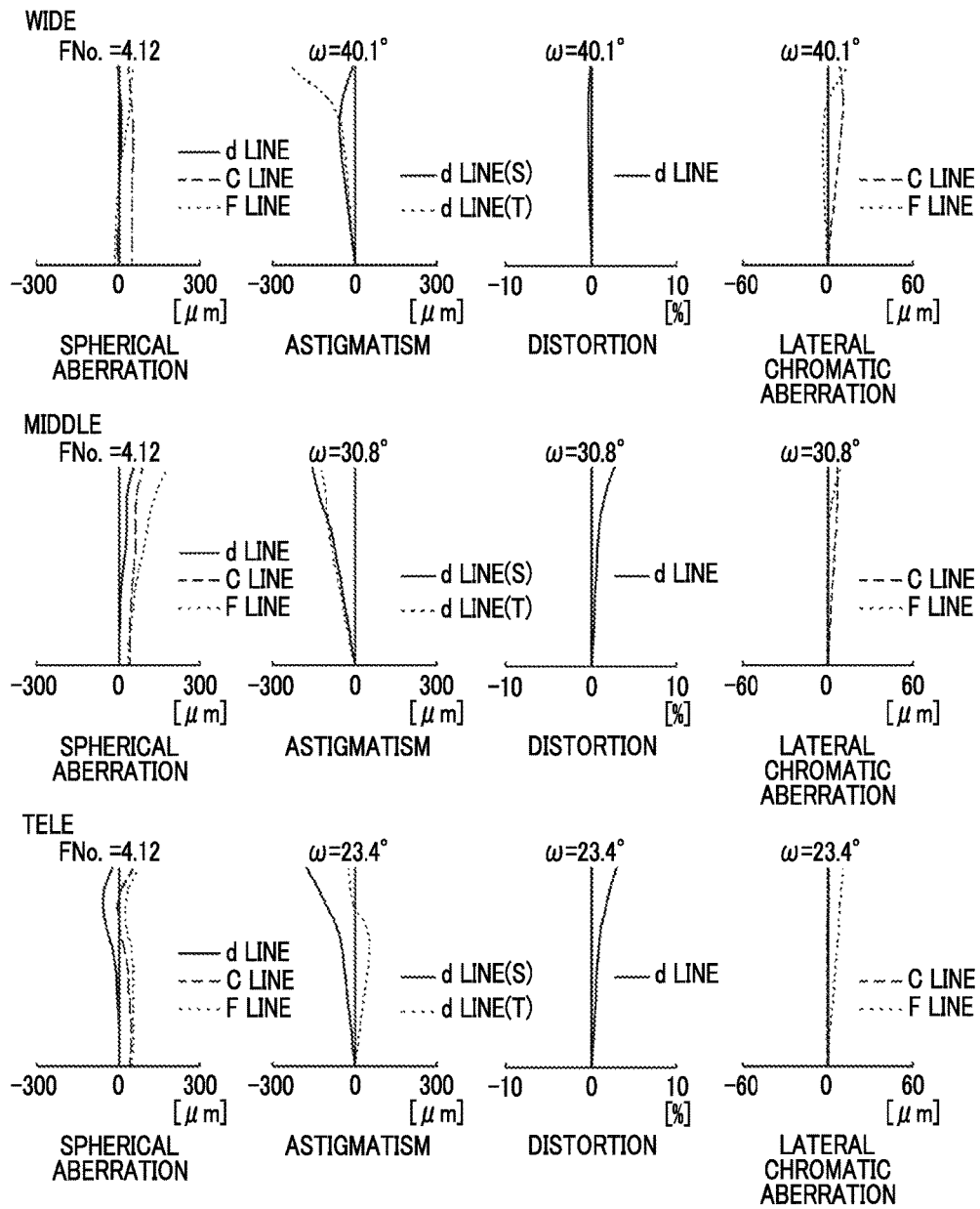
FIG. 22 shows spherical aberration diagrams, astigmatism diagrams, distortion diagrams, lateral chromatic aberration diagrams of the zoom lens of Example 5 of the present invention.
Figure 23:
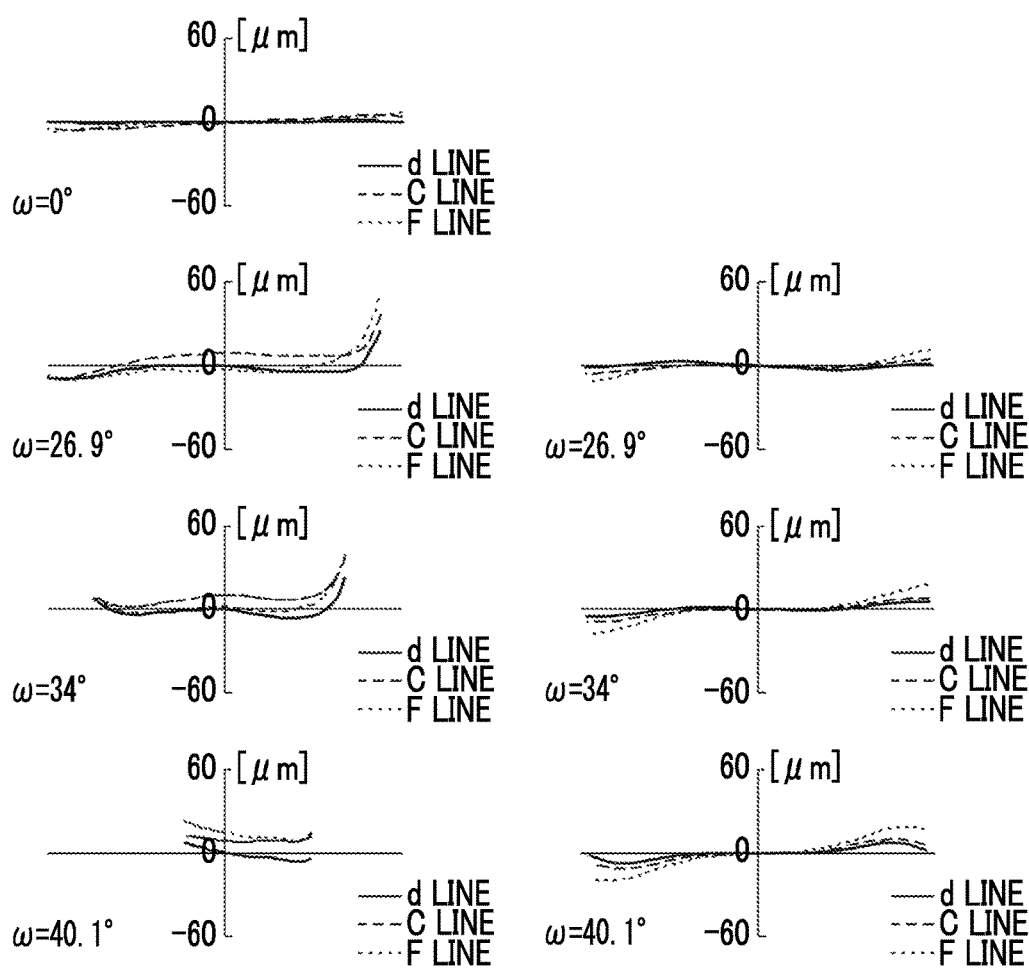
FIG. 23 shows lateral aberration diagrams at the wide-angle end of the zoom lens of Example 5 of the present invention.
Figure 24:
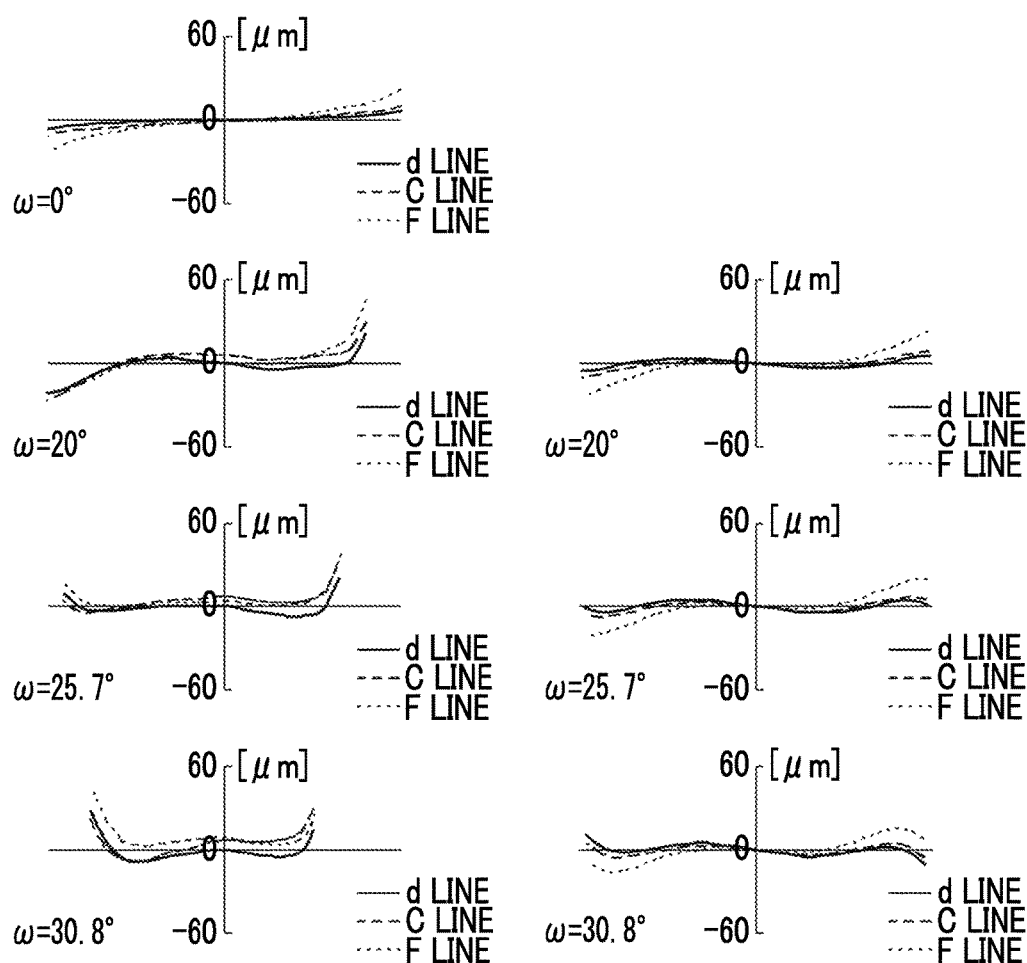
FIG. 24 shows lateral aberration diagrams at the middle focal length state of the zoom lens of Example 5 of the present invention.
Figure 25:
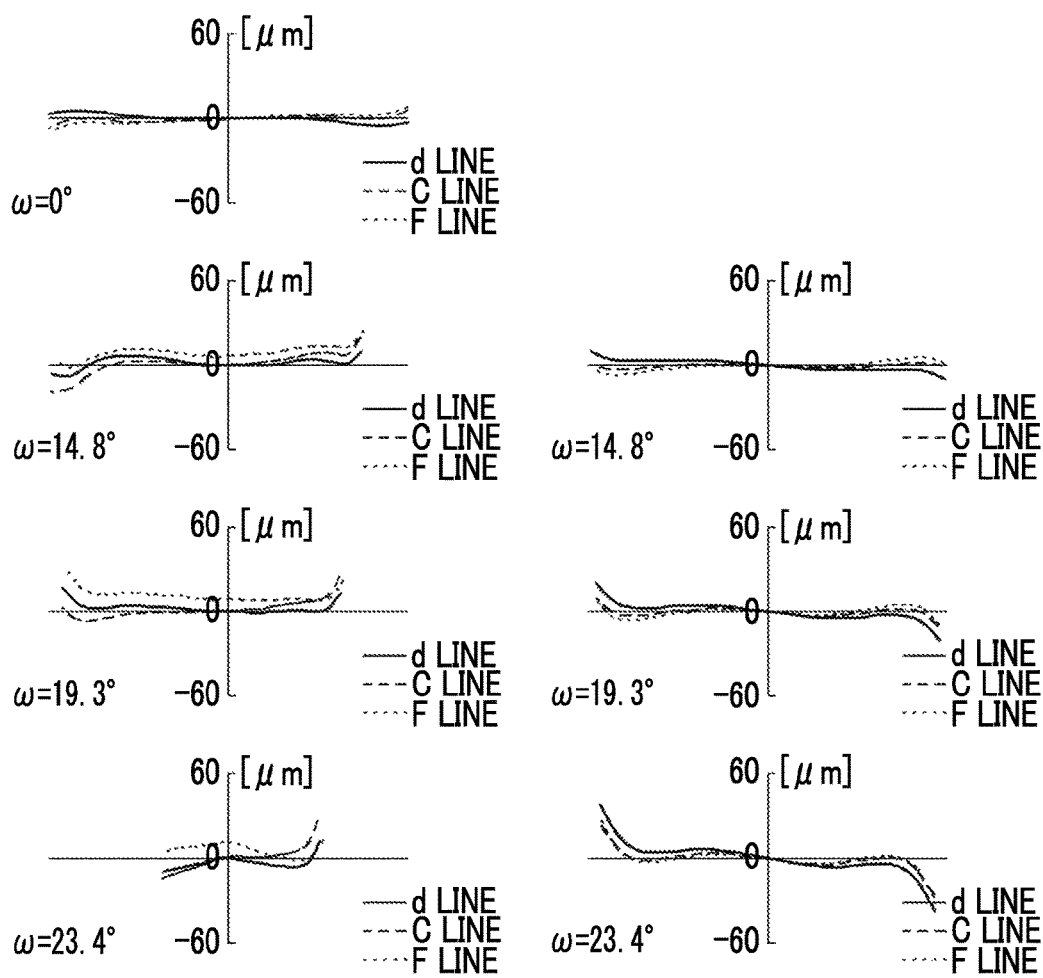
FIG. 25 shows lateral aberration diagrams at the telephoto end of the zoom lens of Example 5 of the present invention.

In FIG. 7, regarding the half angles of view ω, lateral aberrations in the tangential direction are shown in the left column, and lateral aberrations in the sagittal direction are shown in the right column. In these lateral aberration diagrams, aberrations at the d line are shown. Aberrations at the d line, the C line, and the F line are respectively indicated by the solid line, the long dashed line, and the short dashed line. The ω of each lateral aberration diagram means a half angle of view. The lateral aberration diagrams shown in FIG. 7 show aberrations at the wide-angle end. Likewise, FIG. 8 shows lateral aberration diagrams at the middle focal length state, and FIG. 9 shows lateral aberration diagrams at the telephoto end. The aberration diagrams of FIGS. 6 to 9 are in a state where the above-mentioned light blocking member is disposed.

In the description of Example 1, reference signs, meanings, and description methods of the respective data pieces are the same as those in the following examples unless otherwise noted. Therefore, in the following description, repeated description will be omitted.

Example 2

FIG. 2 shows a lens configuration and an optical path of a zoom lens of Example 2. The zoom lens of Example 2 is the same as that of Example 1 in terms of a 5-group configuration, a sign of the refractive power of each lens group, and the number of lenses constituting each lens group. Table 4 shows basic lens data of the zoom lens of Example 2, Table 5 shows specification and variable surface spacings, Table 6 shows aspheric coefficients, and FIGS. 10 to 13 show aberration diagrams in a state where the object at infinity is in focus.

TABLE 4

Example 2

| Si | Ri | Di | Ndj | vdj | RADIUS OF APERTURE |
|---|---|---|---|---|---|
| 1 | 84.6719 | 1.7200 | 1.80518 | 25.42 | |
| 2 | 50.5979 | 7.8385 | 1.88300 | 40.76 | |
| 3 | 154.3548 | DD [3] | | | 28.00 |
| 4 | 83.1317 | 1.3500 | 1.83481 | 42.72 | |
| 5 | 21.2582 | 0.5169 | 1.51876 | 54.04 | |
| *6 | 19.2675 | 12.5504 | | | |

TABLE 4-continued

Example 2

| Si | Ri | Di | Ndj | vdj | RADIUS OF APERTURE |
|---|---|---|---|---|---|
| 7 | −74.4421 | 1.5754 | 1.51823 | 58.90 | 14.94 |
| 8 | 36.1088 | 5.2849 | 1.85478 | 24.80 | |
| 9 | −263.4947 | 8.1268 | | | |
| 10 | −40.0605 | 1.1994 | 1.65412 | 39.62 | |
| 11 | −98.9022 | DD [11] | | | 10.88 |
| 12 | 22.0510 | 6.4301 | 1.43875 | 94.66 | |
| 13 | −51.1808 | 2.1645 | | | |
| 14 (St) | ∞ | 3.8746 | | | |
| *15 | −177.9387 | 1.9493 | 1.73077 | 40.50 | |
| *16 | 272.5702 | 2.3888 | | | |
| 17 | ∞ | 1.4815 | 1.71736 | 29.52 | |
| 18 | 52.3113 | 3.6960 | | | 9.68 |
| 19 | 51.4436 | 1.5391 | 1.55032 | 75.50 | |
| 20 | 24.1448 | 10.2048 | 1.49700 | 81.54 | |
| 21 | −20.6451 | DD [21] | | | 12.57 |
| *22 | 66.6515 | 4.3269 | 1.51633 | 64.06 | |
| *23 | 46.1586 | 12.0443 | | | 13.39 |
| 24 | −22.0672 | 1.2000 | 1.58144 | 40.77 | |
| 25 | −87.9585 | DD [25] | | | |
| 26 | −151.7991 | 6.0143 | 1.88100 | 40.14 | |
| 27 | −51.1437 | 25.6352 | | | |
| 28 | ∞ | 3.2500 | 1.51680 | 64.20 | |
| 29 | ∞ | 0.0000 | | | |

TABLE 5

Example 2

| | WIDE | MIDDLE | TELE |
|---|---|---|---|
| Zr | 1.0 | 1.4 | 1.9 |
| f | 32.97 | 45.33 | 62.32 |
| FNo. | 4.12 | 4.12 | 4.12 |
| 2ω (°) | 79.2 | 61.0 | 46.4 |
| DD [3] | 0.60 | 7.62 | 22.71 |
| DD [11] | 13.28 | 6.40 | 1.44 |
| DD [21] | 1.93 | 3.30 | 4.87 |
| DD [25] | 2.01 | 13.31 | 22.44 |

TABLE 6

Example 2

SURFACE NUMBER

| | 6 | 15 | 16 |
|---|---|---|---|
| KA | 7.4111722E−01 | 2.0207540E+00 | 5.9465481E−01 |
| A3 | 0.0000000E+00 | 0.0000000E+00 | 0.0000000E+00 |
| A4 | −1.7389837E−08 | −2.5098655E−05 | 1.2006648E−05 |
| A5 | −1.9597758E−06 | −3.2799656E−06 | −3.4983574E−06 |
| A6 | 5.8802576E−08 | 5.7883139E−07 | 4.8732222E−07 |
| A7 | 7.9457353E−08 | −4.4686857E−09 | 1.1773132E−07 |
| A8 | −1.6583562E−08 | −4.4686468E−09 | −3.2552494E−08 |
| A9 | 1.2622025E−09 | −3.5581200E−10 | 1.9210944E−09 |
| A10 | −1.2825924E−11 | 1.6600757E−10 | 2.4177991E−10 |
| A11 | −3.7046301E−12 | −1.5302279E−11 | −2.5528015E−11 |
| A12 | 2.5196760E−13 | 6.7532521E−13 | −2.8615796E−12 |
| A13 | −1.5032056E−14 | −1.2185754E−13 | 5.7036058E−13 |
| A14 | 1.1502500E−15 | 2.1490489E−14 | −3.2183220E−14 |
| A15 | −5.0926332E−17 | −1.5139754E−15 | 5.8964551E−16 |
| A16 | 8.4144170E−19 | 3.7382788E−17 | 1.7285526E−18 |

SURFACE NUMBER

| | 22 | 23 |
|---|---|---|
| KA | −3.6032473E+00 | 5.2100512E−01 |
| A3 | 0.0000000E+00 | 0.0000000E+00 |
| A4 | 2.8056239E−05 | 4.0242261E−05 |

TABLE 6-continued

Example 2

SURFACE NUMBER

| A5 | 1.9052128E−07 | −2.3351004E−06 |
|---|---|---|
| A6 | −3.6237577E−07 | 3.1874211E−07 |
| A7 | 4.6510292E−08 | −4.0393713E−08 |
| A8 | −1.7428150E−10 | 3.1850594E−09 |
| A9 | −1.2392166E−10 | 1.9921748E−10 |
| A10 | −2.7543075E−11 | −5.0458294E−11 |
| A11 | 2.0501976E−12 | 1.8396536E−12 |
| A12 | 1.9906423E−13 | 8.2348129E−14 |
| A13 | −1.9644604E−14 | −1.1535724E−14 |
| A14 | 9.6224091E−17 | 1.5495355E−15 |
| A15 | 2.9255887E−17 | −1.1485202E−16 |
| A16 | −6.5500777E−19 | 2.8367919E−18 |

Example 3

FIG. 3 shows a lens configuration and an optical path of a zoom lens of Example 3. The zoom lens of Example 3 is the same as that of Example 1 in terms of a 5-group configuration, a sign of the refractive power of each lens group, and the number of lenses constituting each lens group of the first to fourth lens groups G1 to G4. However, the fifth lens group G5 includes two lenses formed of lenses L51 and L52 in order from the object side. Table 7 shows basic lens data of the zoom lens of Example 3, Table 8 shows specification and variable surface spacings, Table 9 shows aspheric coefficients, and FIGS. 14 to 17 show aberration diagrams in a state where the object at infinity is in focus.

TABLE 7

Example 3

| Si | Ri | Di | Ndj | vdj | RADIUS OF APERTURE |
|---|---|---|---|---|---|
| 1 | 76.3938 | 1.7200 | 1.80809 | 22.76 | |
| 2 | 52.6478 | 7.8273 | 1.81600 | 46.62 | |
| 3 | 171.4707 | DD [3] | | | 28.24 |
| 4 | 78.2969 | 1.3500 | 1.83481 | 42.72 | |
| 5 | 19.6960 | 0.4891 | 1.51876 | 54.04 | |
| *6 | 17.6341 | 12.2895 | | | |
| 7 | −64.0293 | 1.5001 | 1.51633 | 64.24 | 14.69 |
| 8 | 30.9690 | 5.8748 | 1.85025 | 30.05 | |
| 9 | −209.7921 | 7.0952 | | | |
| 10 | −39.8512 | 1.1991 | 1.69100 | 54.82 | |
| 11 | −99.9983 | DD [11] | | | 10.94 |
| 12 | 22.3114 | 5.8954 | 1.43875 | 94.66 | |
| 13 | −48.0317 | 1.8992 | | | |
| 14 (St) | ∞ | 4.0228 | | | |
| *15 | −230.3199 | 1.9510 | 1.69350 | 53.20 | |
| *16 | 330.6154 | 2.7008 | | | |
| 17 | ∞ | 1.3023 | 1.67003 | 47.20 | |
| 18 | 49.6665 | 3.1738 | | | 9.64 |
| 19 | 48.1815 | 1.5708 | 1.54814 | 45.82 | |
| 20 | 27.0037 | 8.0406 | 1.49700 | 81.54 | |
| 21 | −20.6656 | DD [21] | | | 11.35 |
| *22 | 103.8955 | 3.6277 | 1.68893 | 31.08 | |
| *23 | 46.2166 | 13.4004 | | | 11.99 |
| 24 | −18.0464 | 1.1990 | 1.84666 | 23.78 | |
| 25 | −26.0713 | DD [25] | | | |
| 26 | −71.2852 | 6.6206 | 1.91650 | 31.60 | |
| 27 | −33.7128 | 1.5200 | 1.62374 | 47.05 | |
| 28 | −48.8675 | 26.1877 | | | |
| 29 | ∞ | 3.2500 | 1.51680 | 64.20 | |
| 30 | ∞ | 0.0000 | | | |

TABLE 8

Example 3

|  | WIDE | MIDDLE | TELE |
|---|---|---|---|
| Zr | 1.0 | 1.4 | 1.9 |
| f | 32.60 | 44.82 | 61.61 |
| FNo. | 4.12 | 4.12 | 4.12 |
| 2ω (°) | 79.8 | 61.4 | 46.8 |
| DD [3] | 0.60 | 7.73 | 22.25 |
| DD [11] | 13.81 | 6.47 | 1.64 |
| DD [21] | 2.05 | 3.61 | 4.89 |
| DD [25] | 0.84 | 10.00 | 17.86 |

TABLE 9

Example 3

| SURFACE NUMBER | | | |
|---|---|---|---|
|  | 6 | 15 | 16 |
| KA | 6.4475596E−01 | 4.2396565E−01 | −5.0000093E+00 |
| A3 | 0.0000000E+00 | 0.0000000E+00 | 0.0000000E+00 |
| A4 | 1.9908898E−06 | −4.1444177E−05 | −3.1212912E−06 |
| A5 | −2.6062407E−06 | −3.4962935E−06 | −3.5953566E−06 |
| A6 | 4.5548026E−07 | 7.9335180E−07 | 6.6264470E−07 |
| A7 | −2.6870994E−08 | 2.3356288E−08 | 1.4071210E−07 |
| A8 | −6.6123735E−10 | −2.6435804E−08 | −4.5261023E−08 |
| A9 | −1.0407282E−10 | 4.6300756E−09 | 3.7424065E−09 |
| A10 | 3.7136485E−11 | −6.5923157E−10 | 1.1695103E−10 |
| A11 | −7.5819443E−13 | 9.8840296E−11 | −2.3606319E−11 |
| A12 | −2.7560204E−13 | −9.9292021E−12 | −1.4157985E−12 |
| A13 | 1.7915198E−14 | 3.4605812E−13 | 2.8996848E−13 |
| A14 | 1.5535538E−16 | 2.4889667E−14 | −1.0363258E−14 |
| A15 | −4.0491705E−17 | −2.5797070E−15 | −1.0382578E−16 |
| A16 | 9.0377196E−19 | 6.4655099E−17 | 7.1507559E−18 |

| SURFACE NUMBER | | |
|---|---|---|
|  | 22 | 23 |
| KA | −2.5818511E+00 | 4.6301663E−01 |
| A3 | 0.0000000E+00 | 0.0000000E+00 |
| A4 | 1.8665106E−05 | 2.5495141E−05 |
| A5 | −1.3532126E−06 | −2.4144079E−06 |
| A6 | −5.6889112E−08 | 1.3941892E−07 |
| A7 | 6.7679696E−08 | 7.5826871E−08 |
| A8 | −8.2638203E−09 | −1.7056634E−08 |
| A9 | 2.9543302E−10 | 1.4013598E−09 |
| A10 | −2.4716584E−11 | 5.9819221E−12 |
| A11 | 6.9289839E−12 | −8.8541863E−12 |
| A12 | −4.7912538E−13 | 1.3522051E−13 |
| A13 | −1.6101652E−14 | 8.4623037E−14 |
| A14 | 3.3337263E−15 | −8.1105175E−15 |
| A15 | −1.4565723E−16 | 2.9872840E−16 |
| A16 | 2.1400512E−18 | −3.9917471E−18 |

Example 4

FIG. 4 shows a lens configuration and an optical path of a zoom lens of Example 4. The zoom lens of Example 4 is the same as that of Example 3 in terms of a 5-group configuration, a sign of the refractive power of each lens group, and the number of lenses constituting each lens group. Table 10 shows basic lens data of the zoom lens of Example 4, Table 11 shows specification and variable surface spacings, Table 12 shows aspheric coefficients, and FIGS. 18 to 21 show aberration diagrams in a state where the object at infinity is in focus.

TABLE 10

Example 4

| Si | Ri | Di | Ndj | νdj | RADIUS OF APERTURE |
|---|---|---|---|---|---|
| 1 | 76.5341 | 1.7200 | 1.80809 | 22.76 |  |
| 2 | 50.9280 | 7.9528 | 1.83481 | 42.72 |  |
| 3 | 165.3252 | DD [3] |  |  | 27.89 |
| 4 | 103.8469 | 1.3500 | 1.90366 | 31.31 |  |
| 5 | 20.8556 | 0.4900 | 1.63351 | 23.63 |  |
| *6 | 18.8215 | 11.6449 |  |  |  |
| 7 | −132.1313 | 1.3242 | 1.53775 | 74.70 | 14.96 |
| 8 | 31.4734 | 5.6787 | 1.92119 | 23.96 |  |
| 9 | −782.1518 | 8.0123 |  |  |  |
| 10 | −38.7789 | 1.1991 | 1.69350 | 53.20 |  |
| 11 | −93.0078 | DD [11] |  |  | 10.91 |
| 12 | 22.2960 | 5.9513 | 1.43875 | 94.66 |  |
| 13 | −48.0796 | 1.8990 |  |  |  |
| 14 (St) | ∞ | 3.8521 |  |  |  |
| *15 | −235.6937 | 1.9499 | 1.69350 | 53.18 |  |
| *16 | 320.7407 | 2.6473 |  |  |  |
| 17 | ∞ | 1.2991 | 1.66998 | 39.27 |  |
| 18 | 49.7098 | 3.4493 |  |  | 9.56 |
| 19 | 47.1351 | 1.4091 | 1.54814 | 45.82 |  |
| 20 | 24.6086 | 8.0770 | 1.49700 | 81.54 |  |
| 21 | −20.7419 | DD [21] |  |  | 11.33 |
| *22 | 107.1909 | 3.9178 | 1.68893 | 31.16 |  |
| *23 | 45.2777 | 12.4820 |  |  | 11.97 |
| 24 | −16.8941 | 1.1992 | 1.80518 | 25.46 |  |
| 25 | −24.2338 | DD [25] |  |  |  |
| 26 | −75.6856 | 6.5851 | 1.90366 | 31.31 |  |
| 27 | −34.4124 | 1.5191 | 1.60342 | 38.01 |  |
| 28 | −50.3641 | 26.2395 |  |  |  |
| 29 | ∞ | 3.2500 | 1.51680 | 64.20 |  |
| 30 | ∞ | 0.0000 |  |  |  |

TABLE 11

Example 4

|  | WIDE | MIDDLE | TELE |
|---|---|---|---|
| Zr | 1.0 | 1.4 | 1.9 |
| f | 32.48 | 44.65 | 61.38 |
| FNo. | 4.12 | 4.12 | 4.12 |
| 2ω (°) | 80.2 | 61.8 | 47.0 |
| DD [3] | 0.93 | 8.19 | 22.13 |
| DD [11] | 13.92 | 6.69 | 1.74 |
| DD [21] | 2.54 | 3.93 | 5.21 |
| DD [25] | 0.78 | 10.20 | 18.22 |

TABLE 12

Example 4

| SURFACE NUMBER | | | |
|---|---|---|---|
|  | 6 | 15 | 16 |
| KA | 6.4539418E−01 | 9.7667826E−01 | −5.0000000E−00 |
| A3 | 0.0000000E+00 | 0.0000000E+00 | 0.0000000E+00 |
| A4 | 8.2750662E−07 | −3.4782793E−05 | 3.3854972E−06 |
| A5 | −2.7628065E−06 | −4.1537029E−06 | −4.0878035E−06 |
| A6 | 5.9497197E−07 | 8.5295259E−07 | 6.6519487E−07 |
| A7 | −5.6619233E−08 | 2.7888695E−10 | 1.2864216E−07 |
| A8 | 1.5840542E−09 | −1.2403035E−08 | −3.6298908E−08 |
| A9 | −9.5298740E−11 | 4.0014214E−10 | 2.1717695E−09 |
| A10 | 4.2401502E−11 | 1.4793228E−10 | 1.4678175E−10 |
| A11 | −4.7113217E−12 | −1.2754981E−11 | −7.6662866E−12 |
| A12 | 2.4341260E−13 | 1.2188827E−12 | −1.6233415E−12 |
| A13 | −1.3677695E−14 | −3.9975390E−13 | −8.0225976E−14 |
| A14 | 1.1167957E−15 | 5.4532462E−14 | 3.9969179E−14 |
| A15 | −5.2543704E−17 | −3.1313559E−15 | −2.9108379E−15 |
| A16 | 9.1198339E−19 | 6.6246435E−17 | 6.7292978E−17 |

TABLE 12-continued

Example 4

| | SURFACE NUMBER | |
|---|---|---|
| | 22 | 23 |
| KA | −3.3268958E+00 | −1.2814093E−02 |
| A3 | 0.0000000E+00 | 0.0000000E+00 |
| A4 | 1.7800912E−05 | 2.4799881E−05 |
| A5 | −1.4430158E−06 | −2.7038149E−06 |
| A6 | 5.6226588E−08 | 2.4416181E−07 |
| A7 | 1.3784442E−08 | 4.6405261E−08 |
| A8 | 3.0768746E−09 | −1.5401534E−08 |
| A9 | −7.6978364E−10 | 2.3901995E−09 |
| A10 | −7.2673810E−12 | −2.0988432E−10 |
| A11 | 1.2832766E−11 | 2.1998336E−12 |
| A12 | −1.1026885E−12 | 2.0503039E−12 |
| A13 | 1.0480622E−14 | −2.9284393E−13 |
| A14 | 3.2523740E−15 | 2.1185963E−14 |
| A15 | −1.8409916E−16 | −8.3430553E−16 |
| A16 | 3.2403356E−18 | 1.3952332E−17 |

Example 5

A lens configuration of a zoom lens of Example 5 is shown in FIG. 5, and an illustration method and a configuration thereof are as described above in the examples shown in FIG. 5. Therefore, repeated description is omitted herein. Table 13 shows basic lens data of the zoom lens of Example 5, Table 14 shows specification and variable surface spacings, Table 15 shows aspheric coefficients, and FIGS. 22 to 25 show aberration diagrams in a state where the object at infinity is in focus.

TABLE 13

Example 5

| Si | Ri | Di | Ndj | vdj | RADIUS OF APERTURE |
|---|---|---|---|---|---|
| 1 | 76.7754 | 1.7000 | 1.85896 | 22.73 | |
| 2 | 52.0478 | 7.4642 | 1.83481 | 42.72 | |
| 3 | 188.1509 | DD [3] | | | 26.80 |
| 4 | 89.5547 | 1.3500 | 1.95375 | 32.32 | |
| 5 | 20.6803 | 0.4910 | 1.63351 | 23.63 | |
| *6 | 19.0808 | 10.4897 | | | |
| 7 | −90.8178 | 1.2110 | 1.49700 | 81.61 | 15.02 |
| 8 | 28.9712 | 6.3958 | 1.85478 | 24.80 | |
| 9 | −358.8867 | DD [9] | | | |
| 10 | −38.3379 | 1.1991 | 1.70154 | 41.15 | |
| 11 | −89.4971 | DD [11] | | | 10.96 |
| 12 | 22.5580 | 6.0687 | 1.43875 | 94.66 | |
| 13 | −45.9389 | 1.9003 | | | |
| 14 (St) | ∞ | 3.7883 | | | |
| *15 | −246.0773 | 1.9509 | 1.73077 | 40.51 | |
| *16 | 490.8369 | 2.1732 | | | |
| 17 | ∞ | 1.3004 | 1.63980 | 34.57 | |
| 18 | 47.8031 | 3.5803 | | | 9.47 |
| 19 | 51.0576 | 1.4104 | 1.51680 | 64.20 | |
| 20 | 22.9372 | 8.7164 | 1.49700 | 81.54 | |
| 21 | −20.6845 | DD [21] | | | 11.36 |
| *22 | 136.0368 | 4.1318 | 1.58313 | 59.38 | |
| *23 | 46.3244 | 12.5596 | | | 11.90 |
| 24 | −16.4687 | 1.2001 | 1.80809 | 22.76 | |
| 25 | −23.8300 | DD [25] | | | |
| 26 | −61.9961 | 5.3734 | 1.95375 | 32.32 | |
| 27 | −34.7463 | 1.5200 | 1.51742 | 52.43 | |
| 28 | −47.7612 | 26.4841 | | | |
| 29 | ∞ | 3.2500 | 1.51680 | 64.20 | |
| 30 | ∞ | 0.0000 | | | |

TABLE 14

Example 5

| | WIDE | MIDDLE | TELE |
|---|---|---|---|
| Zr | 1.0 | 1.4 | 1.9 |
| f | 32.50 | 44.69 | 61.43 |
| FNo. | 4.12 | 4.12 | 4.12 |
| 2ω (°) | 80.2 | 61.6 | 46.8 |
| DD [3] | 0.60 | 8.34 | 20.79 |
| DD [9] | 9.23 | 8.26 | 7.42 |
| DD [11] | 13.52 | 6.74 | 1.78 |
| DD [21] | 1.90 | 3.27 | 4.72 |
| DD [25] | 1.07 | 9.69 | 17.35 |

TABLE 15

Example 5

| | SURFACE NUMBER | | |
|---|---|---|---|
| | 6 | 15 | 16 |
| KA | 6.8031540E−01 | −4.9177377E+00 | −5.0000090E+00 |
| A3 | 0.0000000E+00 | 0.0000000E+00 | 0.0000000E+00 |
| A4 | −2.4285175E−07 | −3.0801057E−05 | 5.5824147E−06 |
| A5 | −1.5042719E−06 | −6.1529002E−06 | −5.6670822E−06 |
| A6 | 2.5825715E−07 | 1.0319654E−06 | 7.0376381E−07 |
| A7 | −3.8567287E−09 | 7.5278648E−08 | 2.2673817E−07 |
| A8 | −3.8647591E−09 | −3.3404744E−08 | −6.0972509E−08 |
| A9 | 3.6456382E−10 | 1.4733890E−09 | 4.2795930E−09 |
| A10 | 3.3739748E−12 | 3.7129886E−10 | 2.0064779E−10 |
| A11 | −1.4857781E−12 | −2.3655690E−11 | −2.8538145E−11 |
| A12 | 4.0698937E−16 | −6.0945343E−12 | −1.7376139E−13 |
| A13 | 3.4080141E−15 | 1.0446855E−12 | −1.7549799E−13 |
| A14 | 1.5107046E−16 | −7.2629039E−14 | 4.8123649E−14 |
| A15 | −1.9218734E−17 | 2.7044627E−15 | −3.2378850E−15 |
| A16 | 4.2171193E−19 | −4.7512983E−17 | 6.9693970E−17 |

| | SURFACE NUMBER | |
|---|---|---|
| | 22 | 23 |
| KA | −2.1438898E+00 | 8.4799322E−01 |
| A3 | 0.0000000E+00 | 0.0000000E+00 |
| A4 | 1.9661972E−05 | 2.4379562E−05 |
| A5 | −3.3734769E−07 | −1.6718058E−06 |
| A6 | −3.0841786E−07 | 2.0028145E−07 |
| A7 | 1.2727396E−07 | 7.0378998E−09 |
| A8 | −2.1357159E−08 | −3.2488253E−09 |
| A9 | 2.1690070E−09 | 3.2416235E−10 |
| A10 | −1.2888661E−10 | 4.8145771E−12 |
| A11 | −1.9716045E−13 | −4.0743293E−12 |
| A12 | 8.1180808E−13 | 2.8971612E−13 |
| A13 | −6.2744662E−14 | −6.1771730E−15 |
| A14 | 1.4964540E−15 | 1.0134753E−15 |
| A15 | 2.4327230E−17 | −1.1874785E−16 |
| A16 | −1.2280738E−18 | 3.5286060E−18 |

Table 16 shows values corresponding to the conditional expressions (1) to (3) of the zoom lenses of Examples 1 to 4, and shows values corresponding to the conditional expressions (4) to (6) of the zoom lens of Example 5. The values shown in Table 16 are based on the d line.

TABLE 16

| EXPRESSION NUMBER | | EXAMPLE 1 | EXAMPLE 2 | EXAMPLE 3 | EXAMPLE 4 |
|---|---|---|---|---|---|
| (1) | fw × tan(ωw)/R4r | −1.050 | −0.310 | −1.044 | −1.129 |
| (2) | (R4r − R4f)/(R4r + R4f) | 0.197 | 0.599 | 0.182 | 0.178 |
| (3) | f4/f1 | −0.273 | −0.244 | −0.276 | −0.275 |

| EXPRESSION NUMBER | | EXAMPLE 5 |
|---|---|---|
| (4) | fw × tan(ωw)/R5r | −1.148 |
| (5) | (R5r − R5f)/(R5r + R5f) | 0.183 |
| (6) | f5/f1 | −0.280 |

As can be seen from the above-mentioned data, in each of the zoom lenses of Examples 1 to 5, the total angle of view at the wide-angle end is equal to or greater than 79°, such that the wide angle is achieved, and the F number is constant in the entire zooming range from the wide-angle end to the telephoto end, such that the zoom lens is formed to have a small size. As a result, aberrations including coma aberration are satisfactorily corrected, and high optical performance is achieved.

Figure 26A:
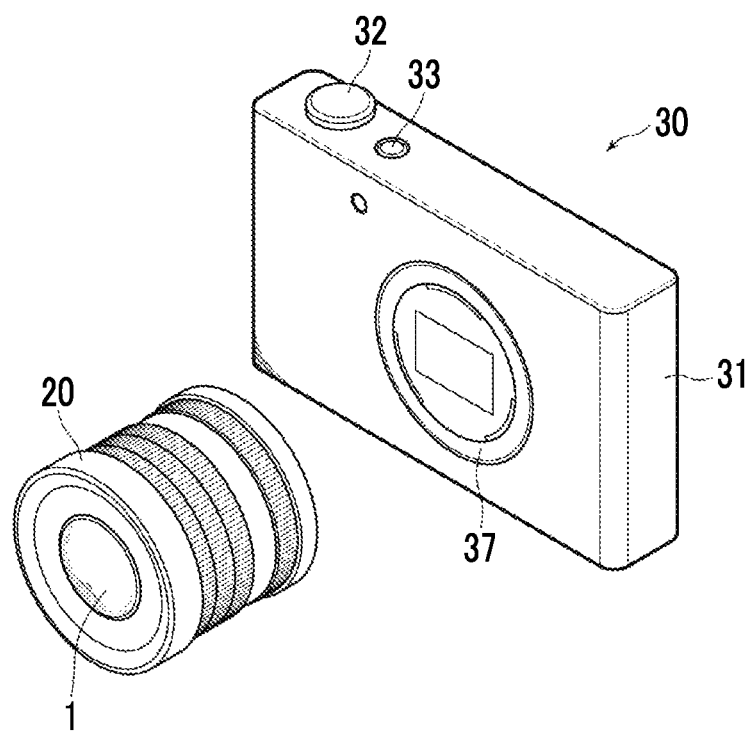
FIG. 26A is a perspective view of the front side of an imaging apparatus according to an embodiment of the present invention.
Figure 26B:
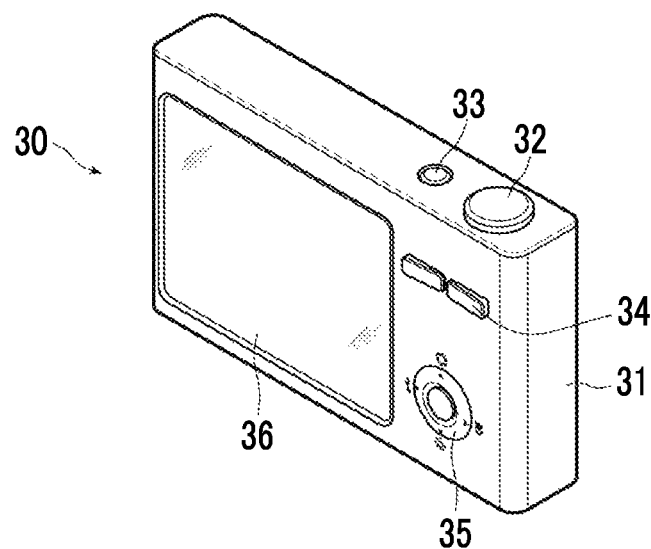
FIG. 26B is a perspective view of the rear side of an imaging apparatus according to the embodiment of the present invention.

Next, an imaging apparatus according to an embodiment of the present invention will be described. FIGS. 26A and 26B are external views of a camera 30 which is the imaging apparatus according to the embodiment of the present invention. FIG. 26A is a perspective view of the camera 30 viewed from the front side, and FIG. 26B is a perspective view of the camera 30 viewed from the rear side. The camera 30 is a single-lens digital camera on which an interchangeable lens 20 is detachably mounted and which has no reflex finder. The interchangeable lens 20 is configured such that the zoom lens 1 according to the embodiment of the present invention is housed in a barrel.

The camera 30 comprises a camera body 31, and a shutter button 32 and a power button 33 are provided on an upper surface of the camera body 31. Further, operation sections 34 and 35 and a display section 36 are provided on a rear surface of the camera body 31. The display section 36 is for displaying a captured image and an image within an angle of view before imaging.

An imaging aperture, through which light from an imaging target is incident, is provided at the center on the front surface of the camera body 31. A mount 37 is provided at a position corresponding to the imaging aperture. The interchangeable lens 20 is mounted on the camera body 31 with the mount 37 interposed therebetween.

In the camera body 31, there are provided an imaging element, a signal processing circuit, a recording medium, and the like. The imaging element such as a charge coupled device (CCD) outputs a captured image signal based on a subject image which is formed through the interchangeable lens 20. The signal processing circuit generates an image through processing of the captured image signal which is output from the imaging element. The recording medium records the generated image. The camera 30 captures a still image or a moving image by pressing the shutter button 32, and records image data, which is obtained through imaging, in the recording medium.

The present invention has been hitherto described through embodiments and examples, but the present invention is not limited to the above-mentioned embodiments and examples, and may be modified into various forms. For example, values such as the radius of curvature, the surface spacing, the refractive index, the Abbe number, and the aspheric coefficient of each lens are not limited to the values shown in the numerical examples, and different values may be used therefor.

Further, the imaging apparatus of the present invention is also not limited to the above-mentioned configurations. For example, the present invention may be applied to a single-lens reflex camera, a film camera, a video camera, and the like.

What is claimed is:

1. A zoom lens consisting of, in order from an object side:
a first lens group that has a positive refractive power;
a second lens group that has a negative refractive power;
a third lens group that has a positive refractive power;
a fourth lens group that has a negative refractive power; and
a fifth lens group that has a positive refractive power,
wherein all intervals between the lens groups adjacent to each other change during zooming,
wherein an aperture diaphragm is disposed between a surface of the second lens group closest to an image side and a surface of the fourth lens group closest to the object side,
wherein the first lens group and the fifth lens group each consist of two or less lenses,
wherein a lens of the second lens group closest to the object side is a meniscus lens which has a negative refractive power and of which an object side surface has a convex shape,
wherein a lens of the fourth lens group closest to the image side is a meniscus lens which has a negative refractive power and of which an image side surface has a convex shape, and
wherein the following conditional expression (3) is satisfied, $$-0.35 < f4/f1 < -0.10 \tag{3},$$

where f4 is a focal length of the fourth lens group, and f1 is a focal length of the first lens group.

2. The zoom lens according to claim 1, wherein the following conditional expression (1) is satisfied, $$-2.5 < fw \times \tan(\omega w)/R4r < -0.1 \tag{1},$$

where fw is a focal length of the zoom lens at a wide-angle end,
ωw is a maximum half angle of view of the zoom lens at the wide-angle end, and
R4r is a radius of curvature of an image side surface of the lens closest to the image side in the fourth lens group.

3. The zoom lens according to claim 1, wherein the following conditional expression (2) is satisfied, $$0.1 < (R4r - R4f)/(R4r + R4f) < 0.9 \tag{2},$$

where R4r is a radius of curvature of an image side surface of the lens closest to the image side in the fourth lens group, and R4f is a radius of curvature of an object side surface of the lens closest to the image side in the fourth lens group.

4. The zoom lens according to claim 1, wherein both a lens of the third lens group closest to the object side and a lens of the third lens group closest to the image side are positive lenses.

5. The zoom lens according to claim 1, wherein a resin having an aspheric shape is attached to at least one of an object side surface and an image side surface of the lens of the second lens group closest to the object side.

6. The zoom lens according to claim 1, wherein focusing is performed by moving only a lens of the second lens group closest to the image side.

7. The zoom lens according to claim 1, wherein in the second lens group, at least one group of cemented lenses, each of which is formed by cementing a negative lens and a positive lens, is provided.

8. The zoom lens according to claim 1, wherein during zooming, the fifth lens group remains stationary with respect to an image plane.

9. An imaging apparatus comprising the zoom lens according to claim 1.

* * * * *